United States Patent
Liu et al.

(10) Patent No.: US 12,380,917 B2
(45) Date of Patent: Aug. 5, 2025

(54) PERPENDICULAR MAGNETIC RECORDING WRITER WITH TUNABLE TWO BIAS BRANCHES

(71) Applicant: Headway Technologies, Inc., Milpitas, CA (US)

(72) Inventors: Yue Liu, Fremont, CA (US); Moris Musa Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/117,135

(22) Filed: Mar. 3, 2023

(65) Prior Publication Data
US 2024/0296860 A1    Sep. 5, 2024

(51) Int. Cl.
| | |
|---|---|
| G11B 5/127 | (2006.01) |
| G11B 5/11 | (2006.01) |
| G11B 5/23 | (2006.01) |
| G11B 5/235 | (2006.01) |
| G11B 5/31 | (2006.01) |

(52) U.S. Cl.
CPC ........... *G11B 5/1278* (2013.01); *G11B 5/11* (2013.01); *G11B 5/23* (2013.01); *G11B 5/235* (2013.01); *G11B 5/3116* (2013.01); *G11B 5/315* (2013.01)

(58) Field of Classification Search
None
See application file for complete search history.

(56) References Cited

U.S. PATENT DOCUMENTS

| | | | | |
|---|---|---|---|---|
| 9,076,463 | B2* | 7/2015 | Yamada et al. | G11B 5/1278 |
| 9,390,731 | B2* | 7/2016 | Koui | G11B 5/314 |
| 10,325,618 | B1* | 6/2019 | Wu et al. | G11B 5/1278 |
| 10,643,643 | B1* | 5/2020 | Gao et al. | G11B 5/1278 |
| 10,714,127 | B1* | 7/2020 | Chen et al. | G11B 5/1278 |
| 10,714,129 | B1* | 7/2020 | Tang et al. | G11B 5/1278 |
| 10,714,132 | B1* | 7/2020 | Chen et al. | G11B 5/1278 |
| 10,997,988 | B1* | 5/2021 | Le et al. | G11B 5/1278 |
| 11,049,513 | B1* | 6/2021 | Le et al. | G11B 5/1278 |
| 11,152,021 | B1* | 10/2021 | Liu et al. | G11B 5/1278 |
| 11,557,314 | B1* | 1/2023 | Asif Bashir et al. | G11B 5/1278 |
| 11,600,293 | B1* | 3/2023 | Lam et al. | G11B 5/315 |
| 11,869,548 | B1* | 1/2024 | Asif Bashir et al. | G11B 5/1278 |
| 11,881,237 | B1* | 1/2024 | Asif Bashir et al. | G11B 5/1278 |

* cited by examiner

*Primary Examiner* — Craig A. Renner
(74) *Attorney, Agent, or Firm* — DLA Piper LLP (US)

(57) ABSTRACT

The present embodiments relate to a perpendicular magnetic recording (PMR) write head with a Two Tunable bias branch design that can electrical separate a WS1/PP3 and a SS/LS to form two tunable bias branches. A write head can include a main pole, a write gap(WG) disposed adjacent to the main pole, and a hot seed (HS) layer connected to the WG. The PMR write head can also include a trailing shield, a side shield and a leading shield. Two tunable bias branches can be formed to electrically separate the trailing shield and the side and leading shields. A first branch can include a first electrical path between the main pole and the trailing shield. The tunable bias branches can also include a second branch forming a second electrical path between the main pole and the side and leading shields.

17 Claims, 19 Drawing Sheets

PERPENDICULAR MAGNETIC RECORDING WRITER WITH TUNABLE TWO BIAS BRANCHES

TECHNICAL FIELD

Embodiments of the invention relate to the field of electro-mechanical data storage devices. More particularly, embodiments of the invention relate to the field of a perpendicular magnetic recording (PMR) write head for a hard disk drive (HDD).

BACKGROUND

Volumes of digital data can be stored on a disk drive, such as a Hard disk drive (HDD). The disk drive can comprise a head that can interact with a magnetic recording medium (e.g., a disk) to read and write magnetic data onto the disk. For instance, the disk drive can include a write head that is positioned near the disk and can modify a magnetization of the disk passing immediately under the write head.

Disk drives can utilize various technologies to write to a disk. For example, perpendicular magnetic recording (PMR) can relate to magnetic bits on a disk are directed perpendicular (e.g., either up or down) relative to the disk surface. PMR recording can increase storage density to the disk by aligning poles of magnetic elements on the disk perpendicularly to the surface of the disk.

SUMMARY

A head for a disk drive is described. Particularly, the present embodiments relate to a perpendicular magnetic recording (PMR) write head with a Two Tunable bias branch design that can electrical separate a WS1/PP3 and a SS/LS to form two tunable bias branches.

In a first example embodiment, a perpendicular magnetic recording (PMR) write head is provided. The PMR write head can include a main pole including a tip portion configured to be disposed at an air-bearing surface (ABS) and configured to interact with a magnetic recording medium. The PMR write head can also include a write gap (WG) disposed adjacent to the main pole and a hot seed (HS) layer connected to the WG. The PMR write head can also include a write shield, including a trailing shield, a side shield, and a leading shield.

Two tunable bias branches can be formed to electrically separate the trailing shield from the side shield and the leading shield. A first branch can be a first electrical path between the main pole and the trailing shield. The tunable bias branches can also include a second branch forming a second electrical path between the main pole and the side shield and the leading shield.

In some instances, the PMR write head can include an insulation layer disposed between the trailing shield and the side shield.

In some instances, a width of the conducting WG corresponds with a width of the main pole. The insulation layer can separate the side shield and the HS layer.

In some instances, a width of the conducting WG corresponds with a width of the main pole up to a width of the MP and two side gaps. The insulation layer can separate the HS layer and the side shield.

In some instances, a width of the conducting WG corresponds with a width of the HS layer.

In some instances, the insulation layer comprises a first portion separating the trailing shield and side shield and a second portion disposed between the conducting WG and the side shield and side gap below HS. The second portion can include a thickness less than that of the first portion.

In some instance, the insulation layer comprises a first portion separating the trailing shield and side shield and a second portion disposed between the conducting WG and HS layer. The second portion can include a thickness less than that of the first portion.

In some instances, the insulation layer further comprises a third portion disposed along sides of the conducting WG and the HS layer.

In some instances, the PMR write head can include two electrical contacts providing an electrical current to the PMR write head.

In some instances, the first electrical path is formed between a first electrical contact, the trailing shield, a conducting WG, and the main pole, and the second electrical contact.

In some instances, the second electrical path is formed between the first electrical contact, a first series resistor, the side shield and leading shield, a conducting side gap (SG) and leading gap (LG), the main pole, and the second electrical contact, wherein the first electrical path is disposed in parallel with the second electrical path.

In some instances, the first electrical path is formed between the first electrical contact, a second series resistor, the trailing shield, the conducting WG, the main pole, and the second electrical contact.

Another example embodiment relates to a device. The device can include a main pole and two electrical contacts configured to provide an electrical current. The device can also include a first tunable bias branch forming a first electrical path between the main pole and a trailing shield. The device can also include a second tunable bias branch forming a second electrical path between the main pole and a side shield and leading shield. The electrical current provided by the two electrical contacts can be configured to flow along both the first electrical path and the second electrical path.

In some instances, the second tunable bias branch further comprises: a first series resistor disposed in series with the side shield and leading shield and a metallic conducting side gap (SG) disposed in series between the side shield and the main pole and a metallic conducting leading gap (LG) disposed in series between the leading shield and the main pole.

In some instances, the first tunable bias branch further comprises a metallic conducting write gap (WG) disposed in series between the trailing shield and the main pole.

In some instances, the first tunable bias branch further comprises a second series resistor disposed in series with the trailing shield.

In some instances, a resistance value of any of the first series resistor and the second series resistor can be modified to adjust a ratio between a first current flow value through the write gap to the trailing shield and a second current flow value through the side gap and leading gap to the side shield and leading shield.

In some instances, the device can also include a write gap (WG) disposed adjacent to the main pole; a hot seed (HS) layer connected to the WG; and an insulation layer disposed between the trailing shield and the side shield.

In some instances, a width of the write gap or contact width of write gap to side shield, side gap and MP or contact width of write gap to HS corresponds with any of: a width of the main pole, a width of the main pole and part of side gap up to the main pole and two side gaps, and a width of the HS layer.

Another example embodiment provides a system. The system can include a main pole, a write gap (WG) disposed adjacent to the main pole, a hot seed (HS) layer connected to the WG, and an insulation layer. The system can also include a first tunable bias branch forming a first electrical path between the main pole and a trailing shield. The system can also include a second tunable bias branch forming a second electrical path between the main pole and a side shield and a leading shield. Any of the WG and the insulation layer can electrically separate the write shield and side shield for forming the first tunable bias branch and the second tunable bias branch.

In some instances, the insulation layer includes one or more layers of an oxide material. Further, the write gap can include one or more layers of a non-magnetic metallic material.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Disk drives can utilize various technologies to write to a disk. For example, perpendicular magnetic recording (PMR) can relate to magnetic bits on a disk are directed perpendicular (e.g., either up or down) relative to the disk surface. PMR recording can increase storage density to the disk by aligning poles of magnetic elements on the disk perpendicularly to the surface of the disk.

Further, a disk drive head can include a main pole (MP) with a tip portion configured to be disposed near the surface of the disk. The distance between the main pole tip portion and the disk can be controlled by a dynamic fly height (DFH) writer heater. Particularly, DFH writer heater can heat a portion of the head, causing the MP to expand or contract, thereby modifying the distance between the main pole tip portion and the disk. Electrical energy can be provided to any of the DFH writer heater and the MP tip portion via electrical pads, forming a circuit in the head.

In many cases, a tunable pole design can form an electric path through a MP tip portion in parallel with the DFH writer heater without changing an existing pad layout of a PMR head. When the DFH writer heater is turned on, a branch of current can flow through MP tip. The current through the MP tip region may not only heat up but also introduce an Oersted bias field to the MP tip region including MP tip, HS and SS tip. With the locally concentrated heating, MP tip protrusion and write-ability can be improved. With the bias from the Oersted field, MP and HS rotation may become more coherent and can improve writer high frequency response.

Figure 1:
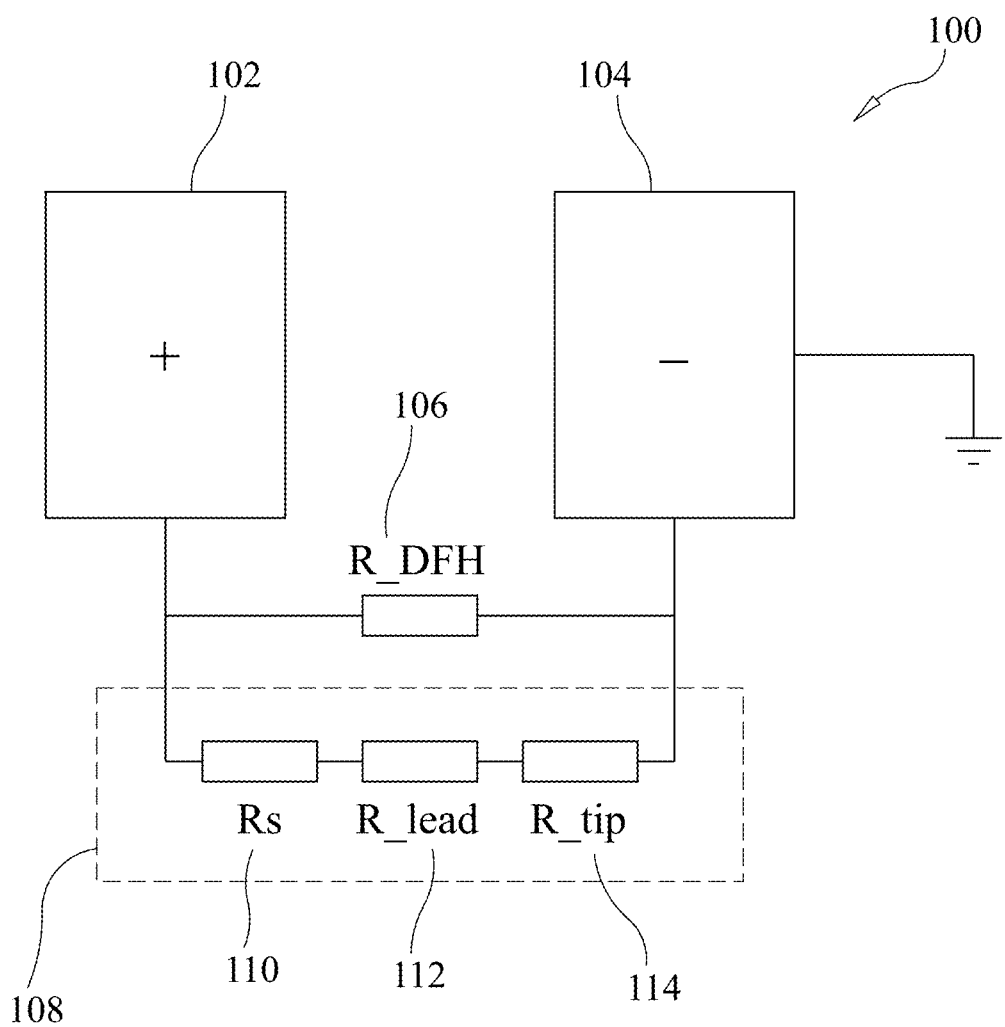
FIG. 1 illustrates a circuit design of an example tunable pole performance (TPP) design for a write head according to an embodiment.

FIG. 1 illustrates a circuit design 100 of an example tunable pole performance (TPP) design for a write head. A MP tip can be electrically connected to either trailing side hot seed (HS) or side shield (SS) or both HS and SS, which is further illustrated in FIGS. 2A-E and FIGS. 3A-E. As shown in FIG. 1, the circuit 100 can include writer heater pads 102, 104. The pads 102, 104 can initiate a current flow (e.g., a direct current (DC) current flow) through the circuit 100. For example, first pad 102 can provide a positive current flow, with the second pad 104 connected to a ground. The circuit 100 can further include a DFH resistor 106 disposed in parallel with a set of resistors 108. The DFH resistor 106 can be connected to a DFH writer heater. The set of resistors 108 can include a first resistor 110, a lead resistor 112, and a tip resistor 114 in series with one another. The circuit 100 can provide an electrical path along a main pole (MP) tip in parallel to a DFH writer heater.

The tip resistor 114 can account for the resistance at MP tip region. MP can be electrically connected to a build-in series resistor 110, which can be electrically connected to the DFH (+) pad 102. The lead resistor 112 can account for the lead resistance contribution other than the series resistor 110 and the tip resistor 114. The nominal resistance of the series resistor 110 can satisfy both DFH heater power and MP tip bias current requirements.

Further, in FIG. 1, R_tip 114 can account for the resistance at MP tip region. MP back can be electrically connected to a build-in series resistor Rs 110 which is electrically connected to the DFH (+) pad 102 when trailing shield is electrically connected to the DFH (−) pad 104 to form current flow from MP to shield. Alternatively, the trailing shield can be electrically connected to a build-in series resistor Rs 110 which is electrically connected to the DFH (+) pad 102 when MP back is electrically connected to the DFH (−) pad 104 to form current flow from shield to MP. R_lead 112 can account for the lead resistance contribution other than Rs 110 and R_tip 114. The nominal resistance of Rs can be designed to satisfy both DFH heater power and MP tip bias current requirements.

The TPP design as shown in FIG. 1 can introduce an electric current path to MP tip for PMR heads without changing the PMR pad layout so that the PMR preamp and suspension can be applied transparently without any additional resources to backend processes and HDD application. However, for some programs that have already implemented additional pads to form an external bias from preamp to MP tip region, TPP can directly utilize the bias circuit without the parallel bias from writer heater.

Figure 4:
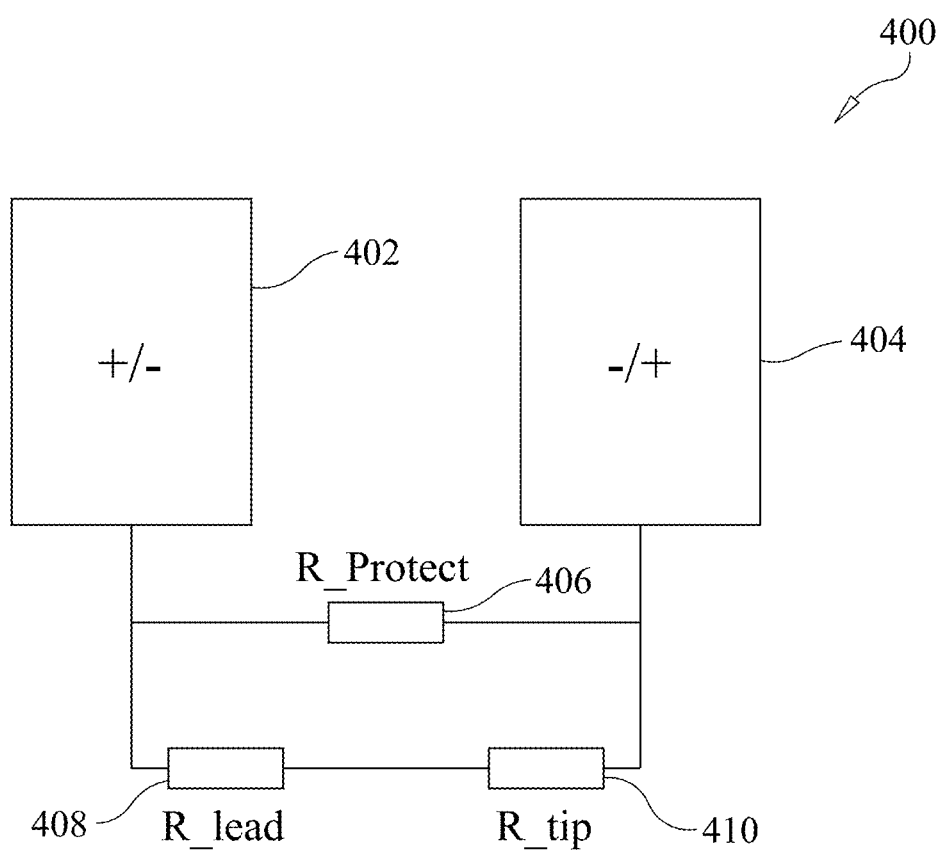
FIG. 4 illustrates an example TPP circuit with two bias pads according to an embodiment.

For instance, FIG. 4 shows the equivalent circuit of the TPP design when two bias pads to preamp are available. In this case, Rs may not be necessary. R_protect (with a resistance of ~5000 hm) can be added in case the device is open when current source is applied. The advantage for TPP with two additional bias pads can include the freedom to adjust the bias current/voltage polarity and value for the best allowable ADC gain.

Figure 2A:
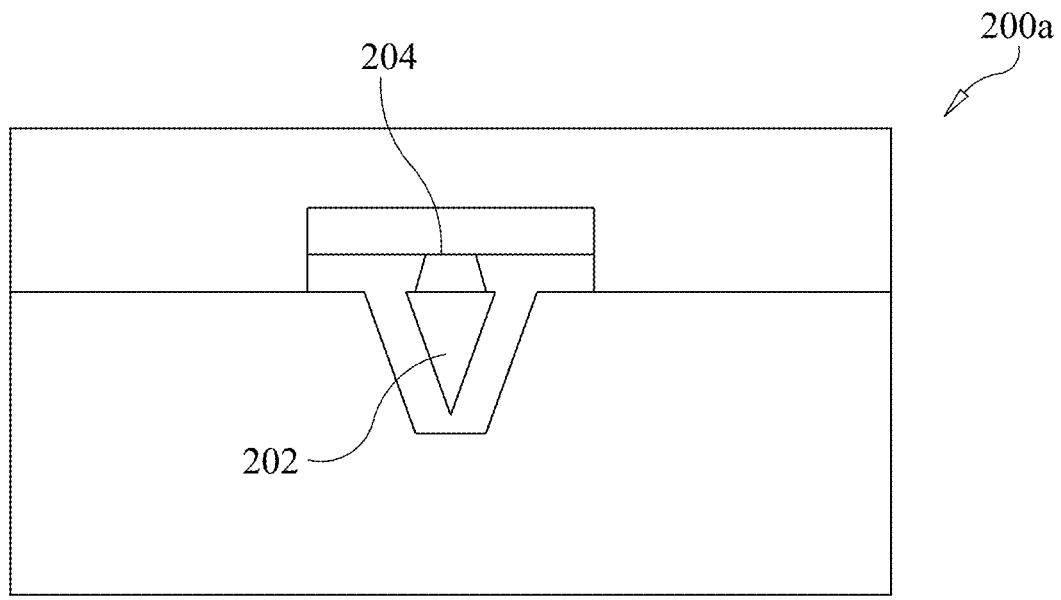
FIG. 2A illustrates a first example write head according to an embodiment.
Figure 2B:
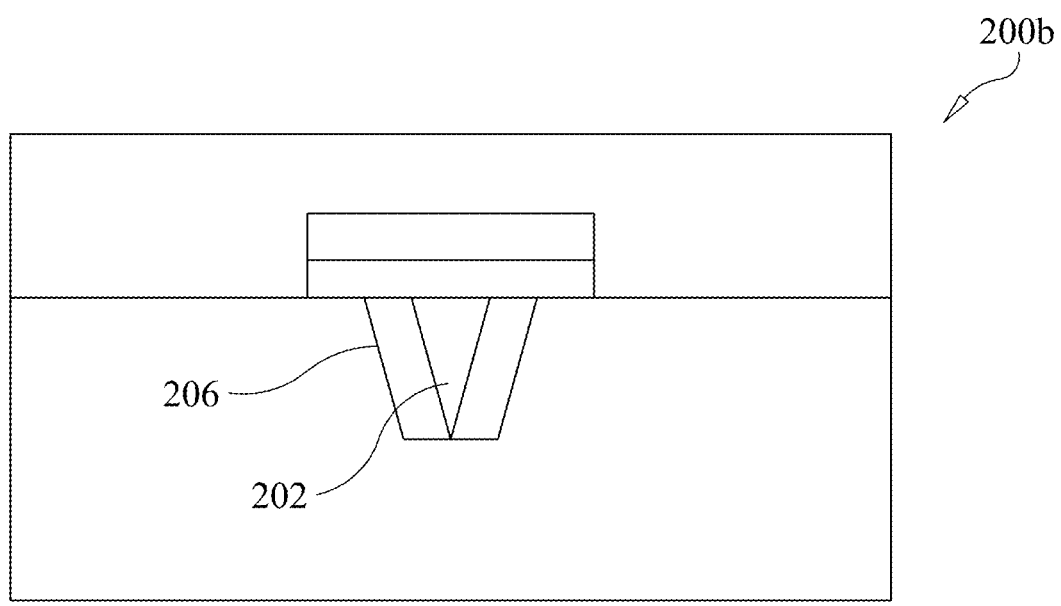
FIG. 2B illustrates a second example write head according to an embodiment.
Figure 2C:
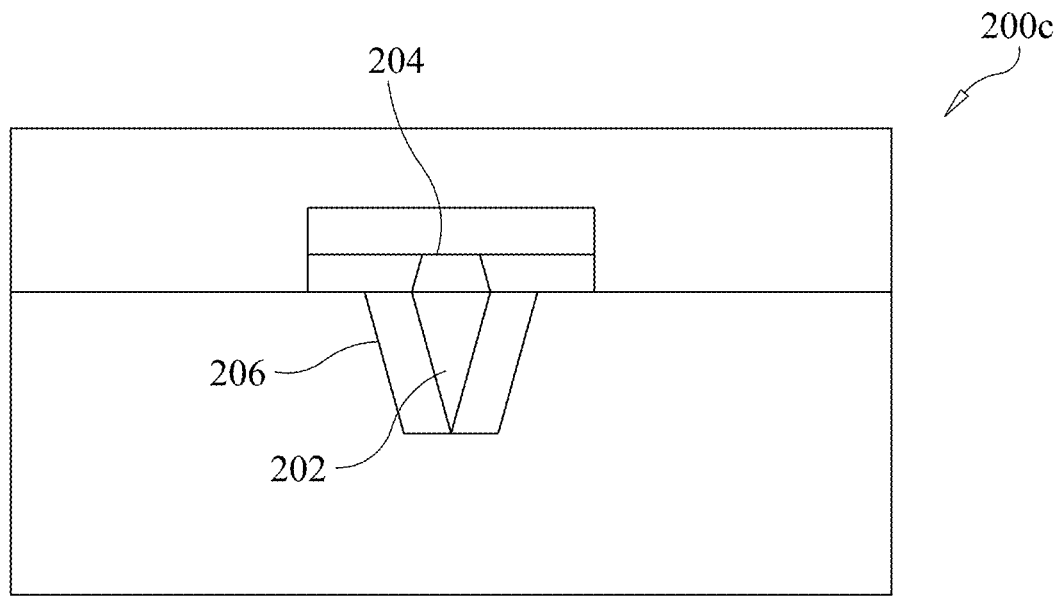
FIG. 2C illustrates a third example write head according to an embodiment.
Figure 2D:
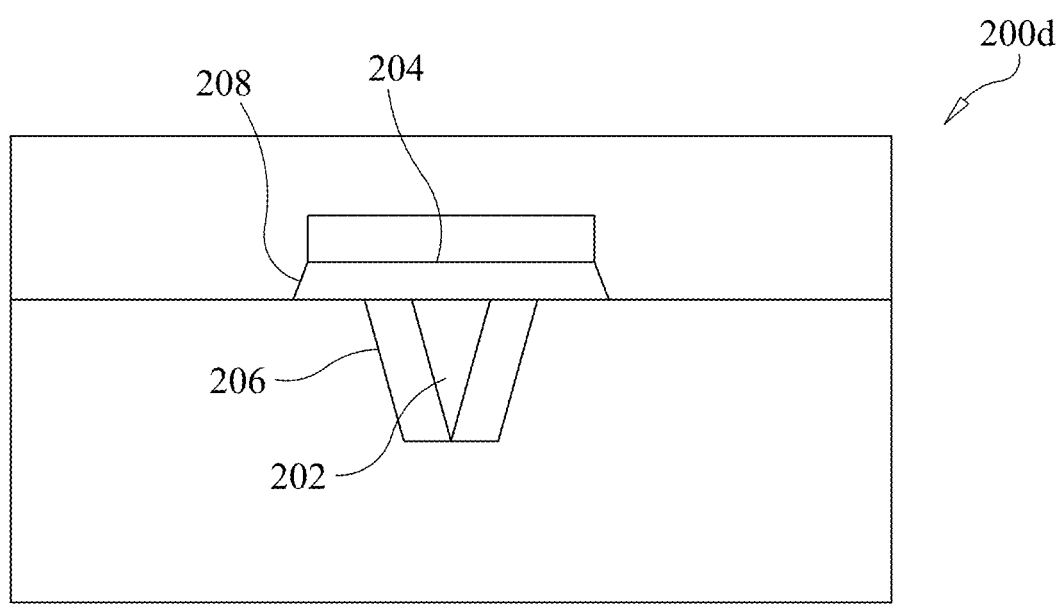
FIG. 2D illustrates a fourth example write head according to an embodiment.

FIGS. 2A-E provide several ABS views of metallic conducting path designs bridging writer shields and the MP. The materials can include either single layer or multiple layers of non-magnetic metallic materials such as Ru, NiCr, Ta, Cu, W, Ti etc. Different designs may provide different R_tip resistances. The materials and dimensions (e.g., width, thickness, and height) of the confined path may also alter the R_tip resistance. If the same material is used, such as in FIG. 2A with a confined path width close to or narrower than PWA, can include a higher R_tip resistance than that in FIG. 2E with a full metallic WG. Similarly, in FIGS. 2C-D, the design in FIG. 2C may include a higher R_tip than the design in FIG. 2D. FIG. 2B can include the MP to SS contact only. FIGS. 2C-2D can have the current flowing to MP from both HS and SS. In FIG. 2C, the R_tip can be lower than that of FIGS. 2A-B, while the design in FIG. 2D can include the R_tip being the lowest if the same material is used and into ABS dimension (height) of the metallic path is similar.

FIG. 2A illustrates a first example write head 200a. As shown in FIG. 2A, an electrical path can be formed between the MP 202 and an WG 204 with a narrow contact around PWA width.

FIG. 2B illustrates a second example write head 200b. As shown in FIG. 2B, an electrical path can be formed between the MP 202 and a SS 206.

FIG. 2C illustrates a third example write head 200c. As shown in FIG. 2C, an electrical path can be formed between both the MP 202 and the WG 204 as FIG. 2A and the MP 202 and the SS 206 as FIG. 2B.

FIG. 2D illustrates a fourth example write head 200d. As shown in FIG. 2D, an electrical path can be formed between both the MP 202 and a metallic WG 208 with full contact width around HS width, and between the MP 202 and SS 206 as FIG. 2B.

Figure 2E:
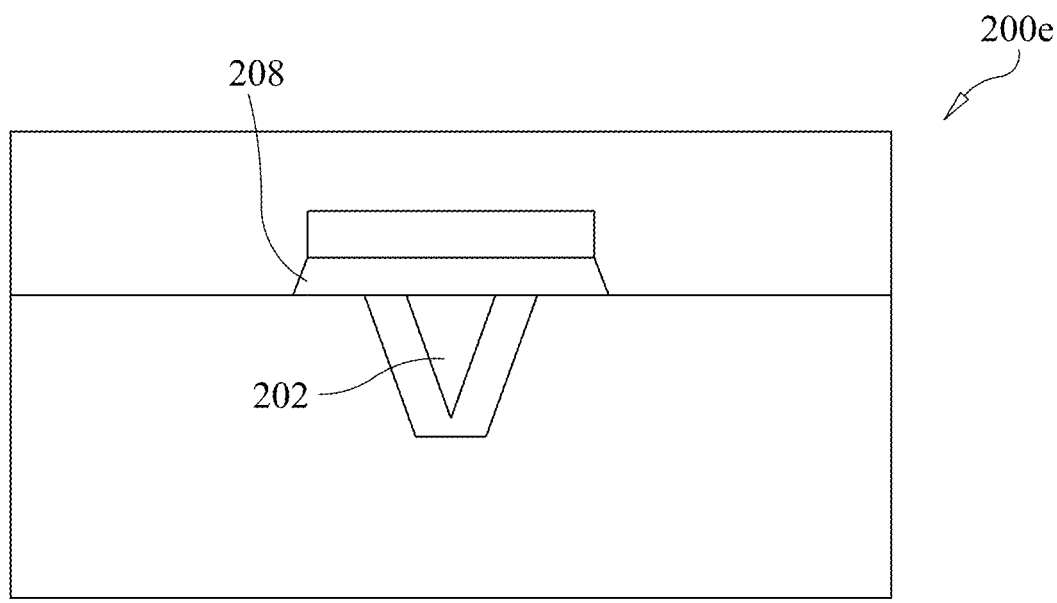
FIG. 2E illustrates a fifth example write head according to an embodiment.

FIG. 2E illustrates a fifth example write head 200e. As shown in FIG. 2E, an electrical path can be formed between the MP 202 and a metallic WG 208 with full contact width around HS width.

In some instances, if a same material is used across write heads, the write head 200a as described in FIG. 2A can include a confined path width close to or narrower than a PWA width with a higher R_tip resistance than write head 200e as described in FIG. 2E with a full metallic WG. Similarly, the write head 200c in FIG. 2C can have a greater R_tip resistance than write head 200d in FIG. 2D. The write head 200b in FIG. 2B may include contact between a MP and the SS&LS, while write heads 200c, 200d in FIGS. 2C-3D can have current flowing to the MP from both an HS and an SS&LS. The R-tip in FIG. 2C can be lower than that of FIGS. 2A-2B, while the write head 200d in FIG. 2D R_tip can be the lowest if the same material is the same and an ABS dimension (e.g., height) of the metallic path is similar.

Figure 3A:
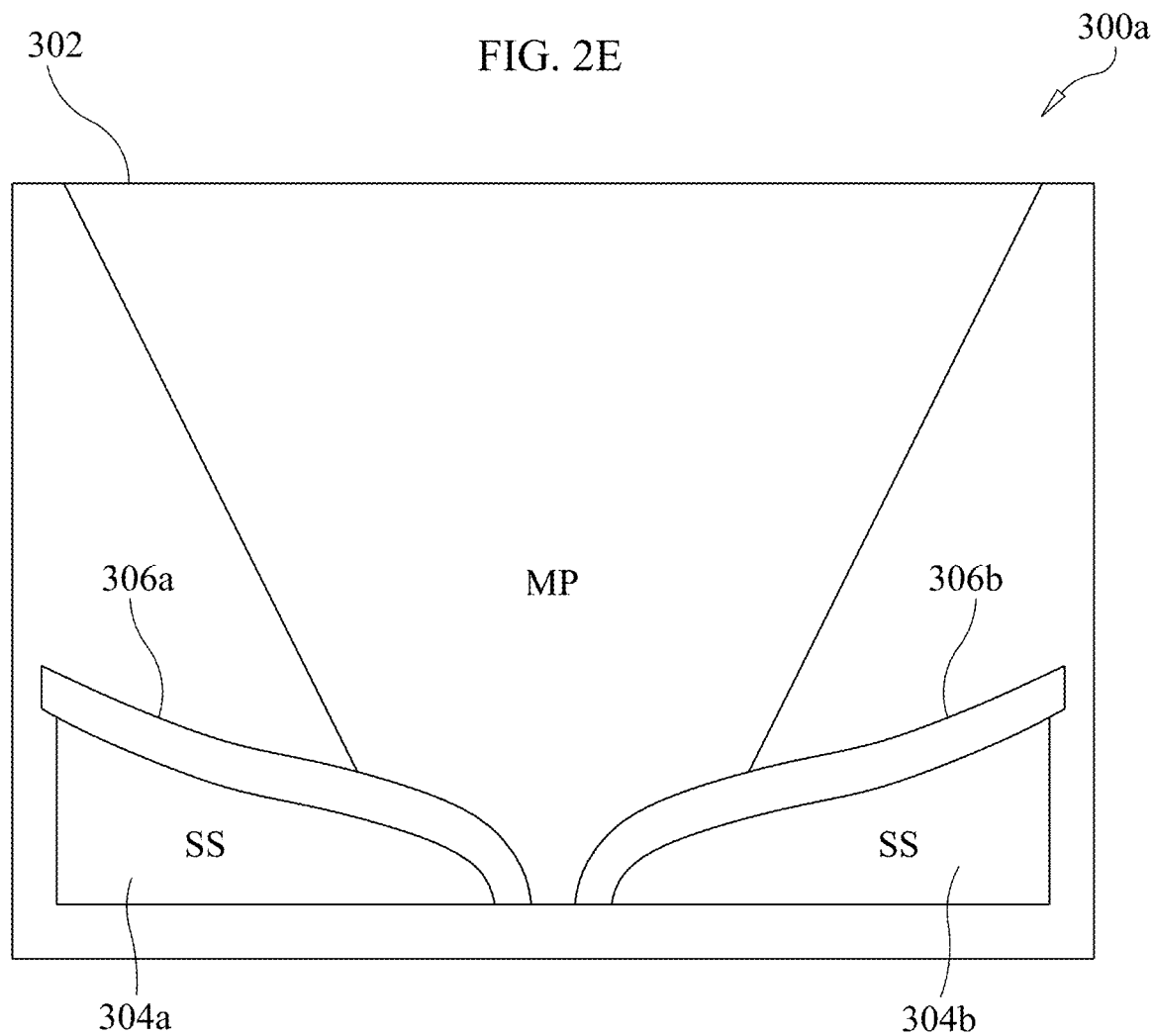
FIG. 3A illustrates a top view of a write head with a conducting path formed between the MP and an SS according to an embodiment.
Figure 3B:
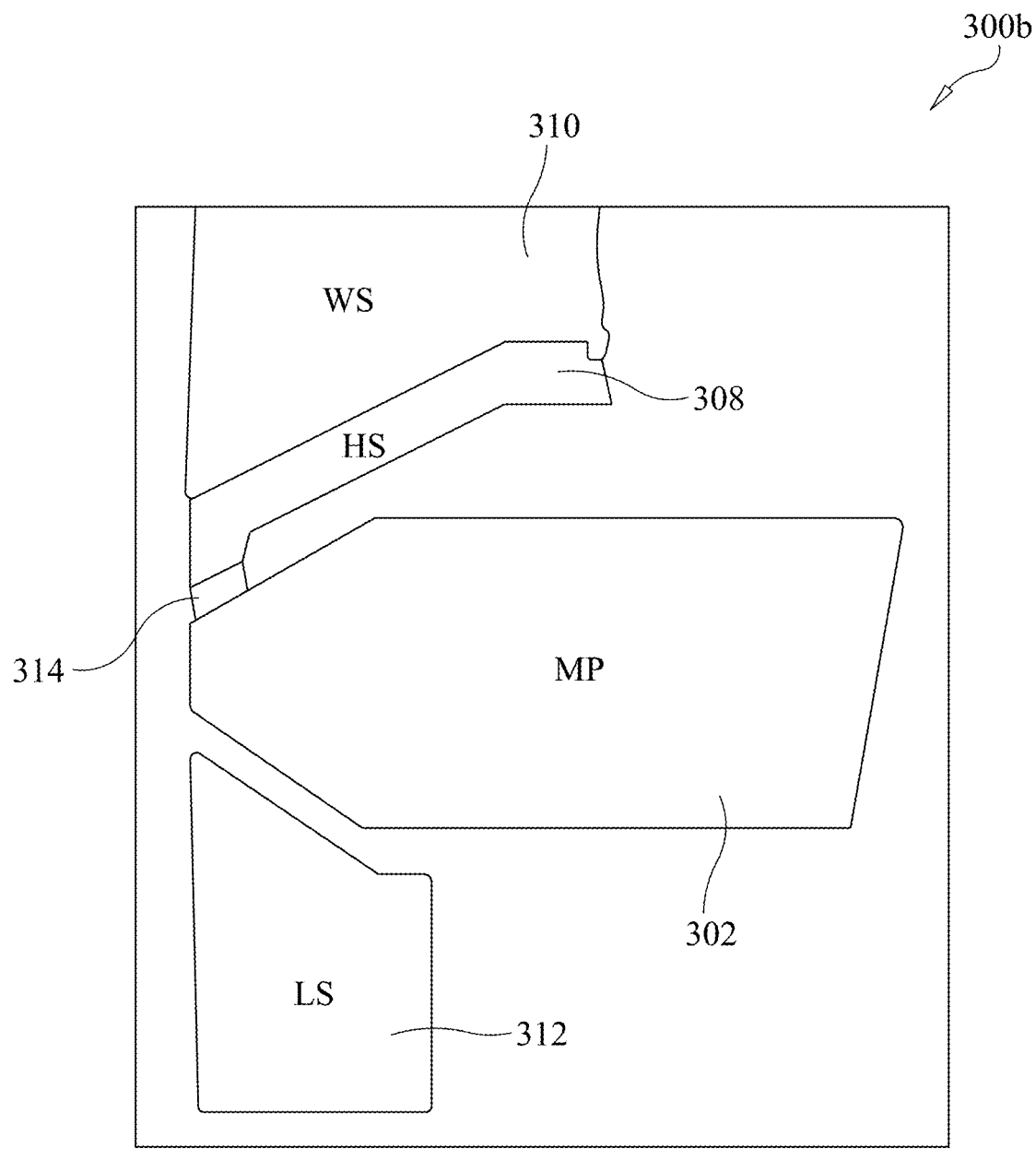
FIG. 3B illustrates a cross section view of a write head with a conducting path exposed to the ABS between a HS tip and MP tip through a metallic WG according to an embodiment.
Figure 3C:
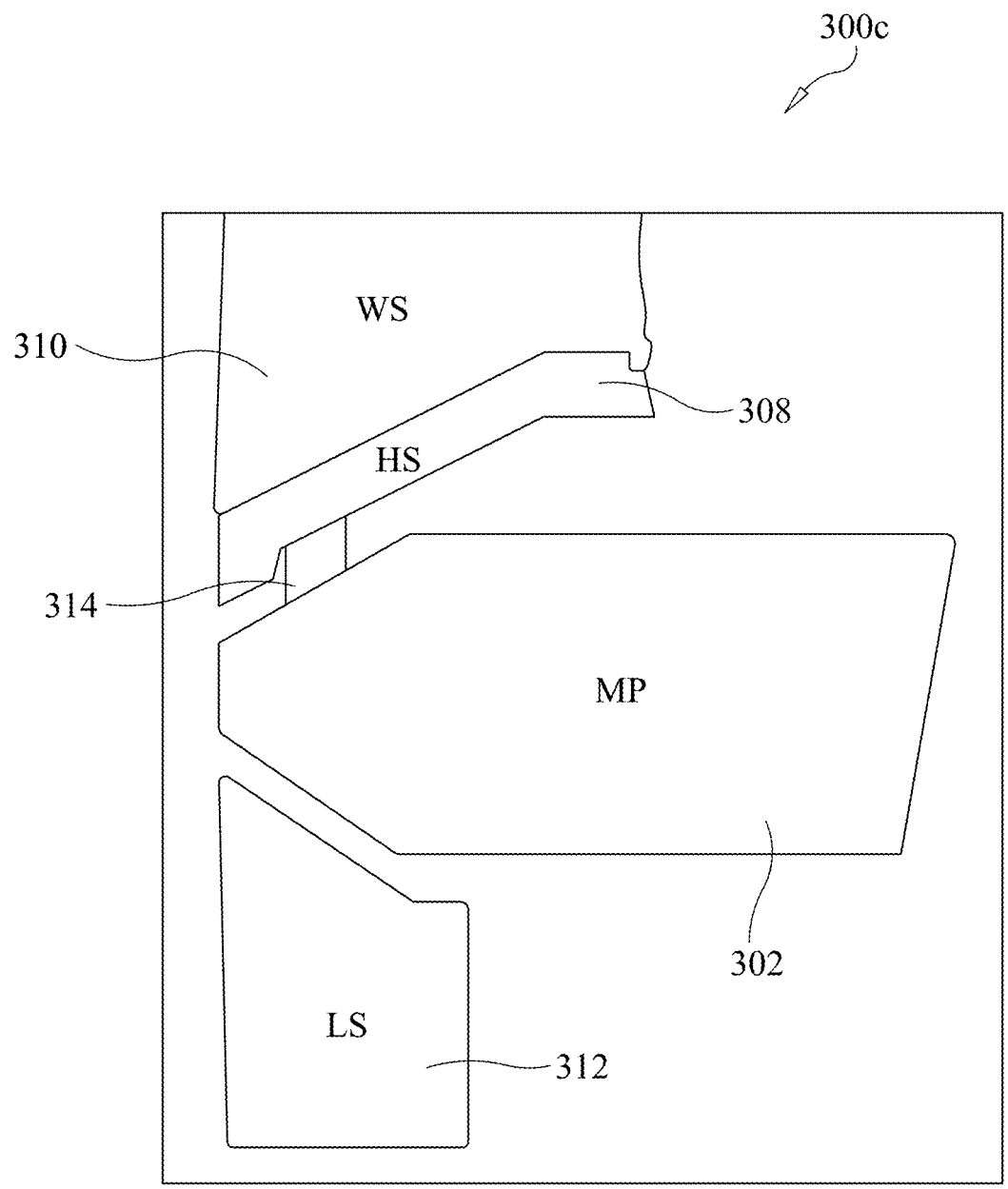
FIG. 3C illustrates a cross section view of a write head with a recessed conducting path between HS and MP according to an embodiment.
Figure 3D:
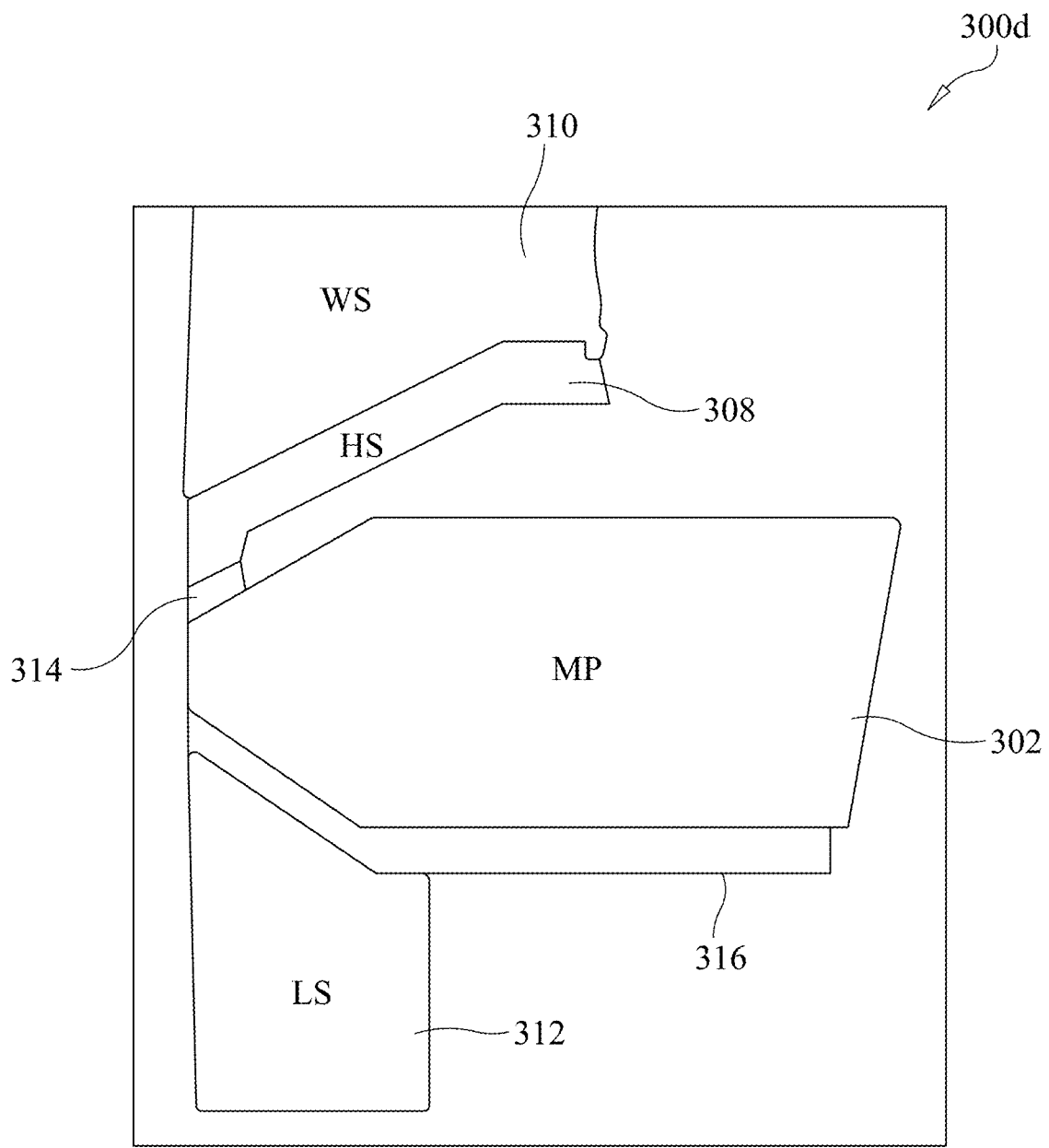
FIG. 3D illustrates a cross section view of a write head with a conducting path exposed to the ABS between a HS tip and MP tip through a metallic WG and a conducting path exposed to the ABS between leading edge taper (LET) and MP tip through a metallic LG according to an embodiment.
Figure 3E:
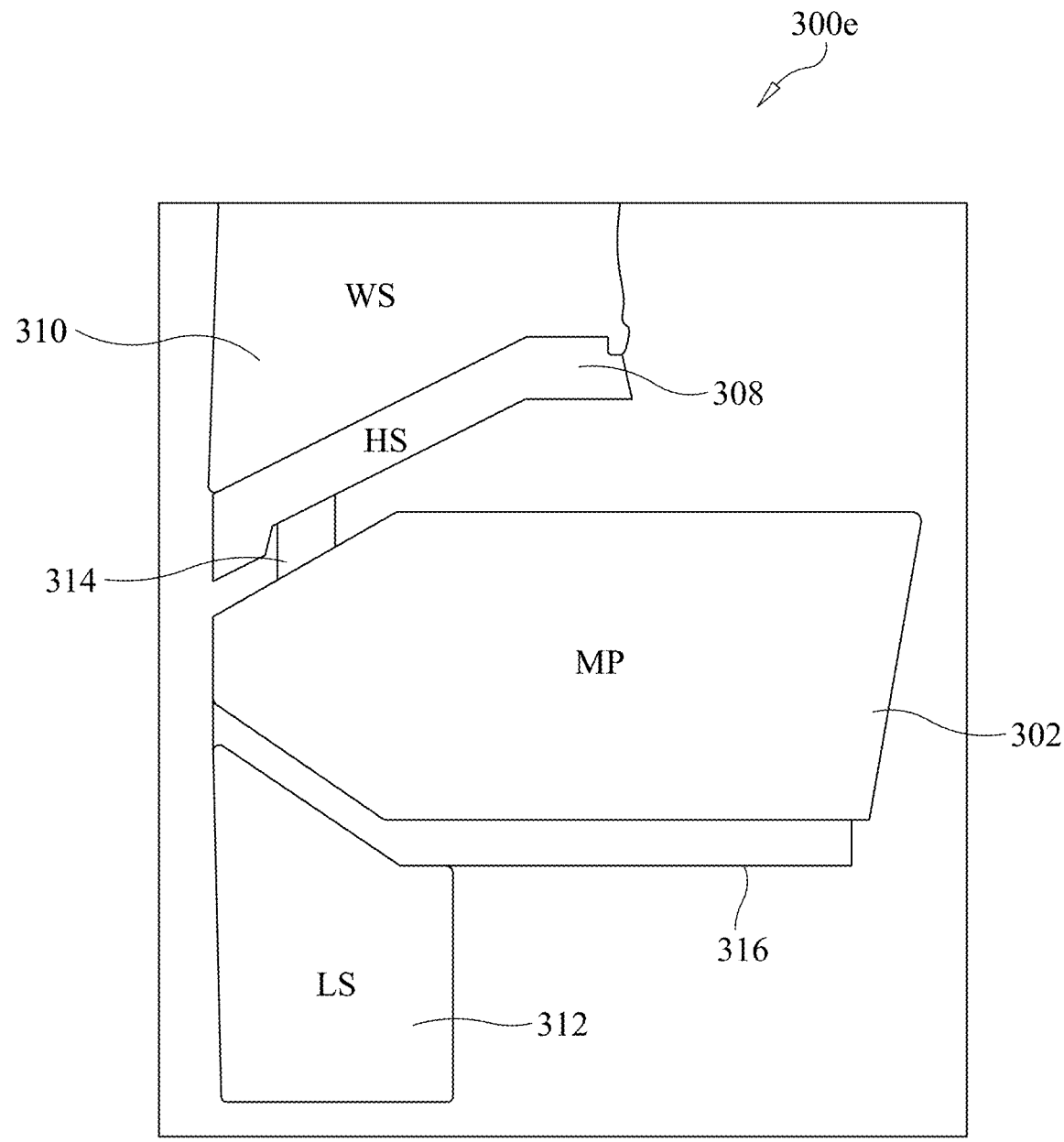
FIG. 3E illustrates a cross section view of a write head with a recessed conducting path between HS and MP and a conducting path exposed to the ABS between LET and MP tip through a metallic leading gap (LG) according to an embodiment.

FIG. 3A illustrates a top view of the designs in any of FIGS. 2B-D with the conducting path formed between SS and MP through metallic SG. A SS tip into ABS height can be around 50-120 nm. SG can be around 20-60 nm. FIG. 3B shows a X-section view of any of the designs in FIG. 2A or 2E with the conducting path exposed to ABS between HS tip and MP tip through metallic WG. The HS tip into ABS height (eTHd) can be around 20-60 nm and the WG thickness can be around 15-25 nm. As eTHd can be short and sensitive to lapping control, R_tip resistance may have large device to device variation. FIG. 3C provides an alternative option with recessed conducting path between HS and MP. The into-ABS recess amount can be between around 50 to 100 nm. The width and height of the recessed conducting path can have more freedom than the exposed design in FIG. 3B, for example, the R_tip resistance can be fine-tuned to a preferred value with less device to device variation. FIG. 3D shows a X-section view of any of the designs in FIG. 2C or 2D with both the conducting path exposed to ABS between HS tip and MP tip through metallic WG and the conducting path exposed to ABS and extended into ABS between leading shield and MP tip through metallic LG 316. FIG. 3E provides an alternative option with recessed conducting path between HS and MP combined with the conducting path exposed to ABS and extended into ABS between leading shield and MP tip through metallic LG 316.

FIG. 3A illustrates a top view of a write head (e.g., write head 300a-c in FIGS. 3A-3C) with a conducting path formed between the MP and an SS. As shown in FIG. 3A, the write head 300a can include a main pole 302 connected to side shield 304a, 304b. The conducting path can be formed between the SS 304a, 304b and MP 302 through a metallic side gap (SG) 306a, 306b. The SS can be disposed near an ABS with a height ranging between 50-120 nm. The SG can be between 20-60 nm.

FIG. 3B illustrates a cross section view of a write head 300b with a conducting path exposed to the ABS between a HS tip and MP tip through a metallic WG. As shown in FIG. 3B, the write head 300b can include a main pole 302 connected to a HS 308 via a WG 314. The HS 308 can be connected to a write shield (WS) 310. A LS 312 can be disposed at an opposition side of the MP 302.

The HS tip into an ABS height (eTHd) can be between 20-60 nm, and the WG thickness can be between 15-22 nm. The eTHd can be short and sensitive to lapping control, R_tip resistance can have a large device to device variation. FIG. 3C illustrates a cross section view of a write head 300c with a recessed conducting path between HS and MP. The into-ABS recess distance can be between around 50-100 nm. The width and height of the recessed conducting path can have more freedom than the exposed write head 300b as shown in FIG. 3B. For instance, a R_tip resistance can be fine-tuned to a preferred value with less device-to-device variation. As illustrated in FIG. 3D and FIG. 3E, write head 300d and write head 300e add a conducting path through metallic LG 316 between MP tip and leading shield on top of the conducting path through metallic WG between MP tip and HS as shown in FIG. 3B and FIG. 3C respectively.

A TPP write head can provide an electric current path to MP tip for PMR heads without changing existing PMR pad layout, such that a PMR preamp and suspension can be applied transparently without any additional cost to backend processes and HDD application. However, for some write heads with additional pads to form an external bias from preamp to MP tip region, a TPP can directly utilize a bias circuit without the parallel bias from writer heater. Additionally, a TPP side bridge (TPP-SB) can be disposed on top of the various types of electric connections between MP tip and writer shields (e.g., as shown in FIGS. 2A-2E, 3A-3E). The TPP-SB design can be applicable to both TPP by parallel path to writer heater bias scheme (e.g., with no additional pads) and TPP by external bias from preamp scheme (e.g., with two additional pads).

FIG. 4 illustrates an example TPP circuit 400 with two bias pads. As shown in FIG. 4, the circuit 400 can include two bias pads 402, 404 and a protect resistor (R_Protect 406) connected between the bias pads. Further, the circuit 400 can include a lead resistor (R_lead 408) and a tip resistor (R_tip 410) in series with one another and in parallel with R_Protect 406. In the embodiment as shown in FIG. 4, an Rs is not needed. R_protect 406 (with a resistance of ~500 Ohm) can be added in case device is open when current source is applied. The advantage for a TPP with two additional bias pads is the freedom to adjust bias current/voltage polarity and value for the best allowable ADC gain.

FIGS. 5A-5D illustrate cross-section view of four designs for 1+1T writers. For example, the designs can include an Ultimate Double Yoke (uDY) top with (e.g., in FIG. 5A) rDWS BGC and (e.g., in FIG. 5B) nDWS bottom. Other designs can include an Easy Planar (ePL) top with (e.g., in FIG. 5C) rDWS BGC and (e.g., in FIG. 5D) nDWS bottom. For the different writer designs, they may all include a top coil and bottom coil to have writing current passing through and trailing shield WS1 (TH1), PP3, main pole (MP), top yoke (TY) and taper bottom yoke (tBY) to form a top driving magnetic loop that brings magnetic flux to MP tip to write positive or negative field into a media. For example, in FIGS. 5A-5B, the PP3 is exposed to the ABS and recessed to the ABS in FIGS. 5C-5D. The PP3 in FIGS. 5C-5D can also be exposed for less process steps when WATE from PP3 and PP3 to TH1 interface is manageable. Further, the exposed PP3 can satisfy thermomagnetic (T/M) requirements with larger metal area at ABS. Although four types of 1+1T writers are shown in this disclosure, the concept can easily be applied to the other types of 1+1T or 1+0T or 2+2T writer structures.

Figure 5A:
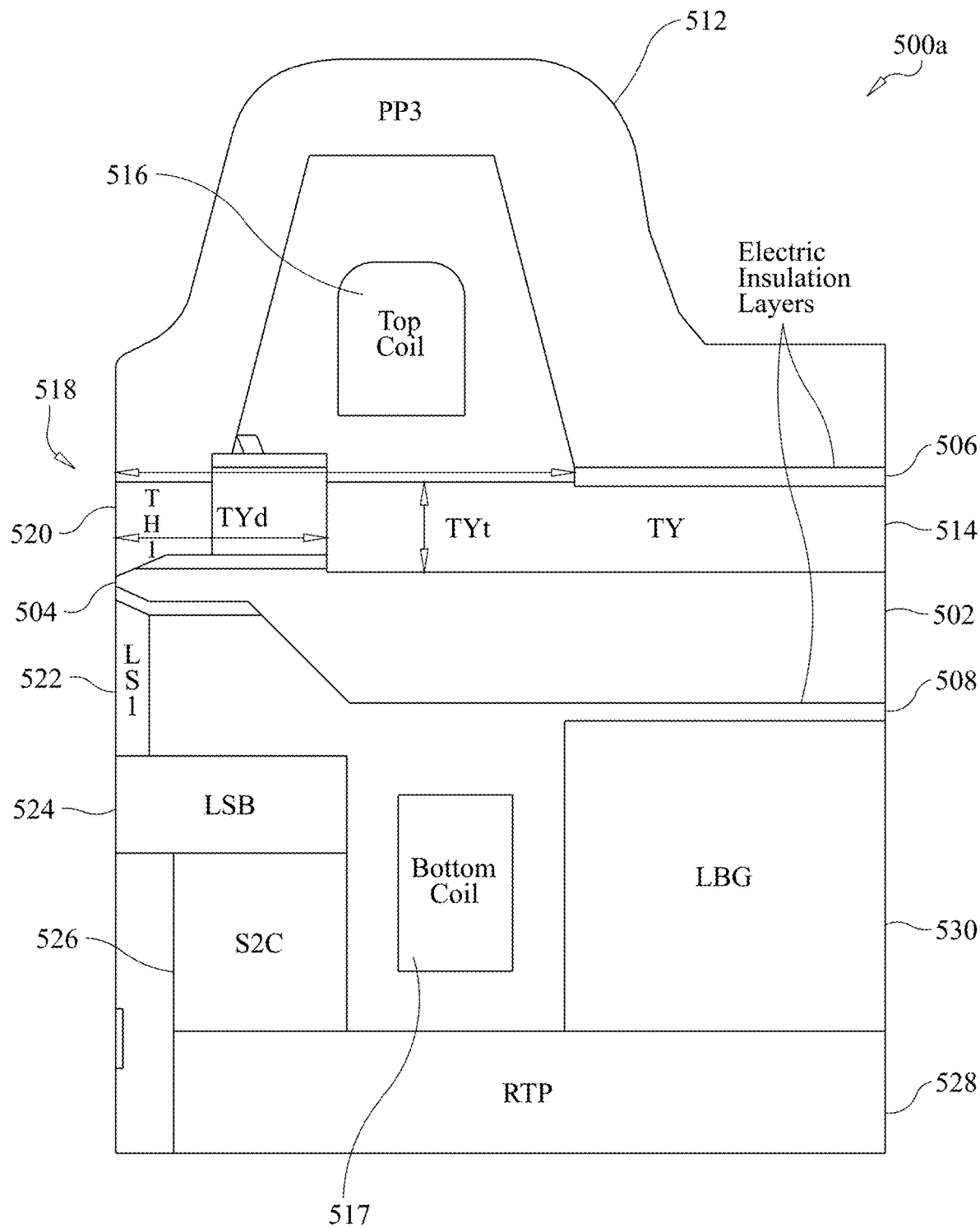
FIG. 5A illustrates a cross section view of a first example write head according to an embodiment.

FIGS. 5A-5D illustrate schematics of various types of writers. For instance, the schematics 500a-d provide various types of 1+1T writers with added insulation layers to allow for electric contact between the MP and writer shields at the MP tip portion. FIG. 5A illustrates a cross section view of a first example write head 500a. The write head 500a can include an ultimate double yoke (uDY) top with a recessed dual write shield DWS (rDWS) design with a back gap connection (BGC).

As shown in FIG. 5A, the head 500a can include a MP 502 that includes a tip portion 504. The tip portion 504 can be disposed near a disk at an air-bearing surface (ABS) 518. The head 500a can further include electric insulation layers 506, 508. A first electric insulation layer 506 can be disposed between an uppermost shield (PP3) 512 and a top yoke (TY) 514. The first electric insulation layer 506 can also be disposed around a first coil 516. A height of the TY 514 can be defined by Tyt and a distance that the TY 514 is recessed from the ABS can be represented by TYd. The second electric insulation layer 508 can separate the main pole 502 from a lower back group (LBG) layer 530 and a second coil 517.

The MP tip portion can be connected to a write shield 520 and a lower shield (LS1) 522. The lower shield (LS1) 522 can be connected to a leading shield bridge (LSB) 524, shield 526, and a return to path (RTP) shield 528 that can be connected to LBG layer 530.

Figure 5B:
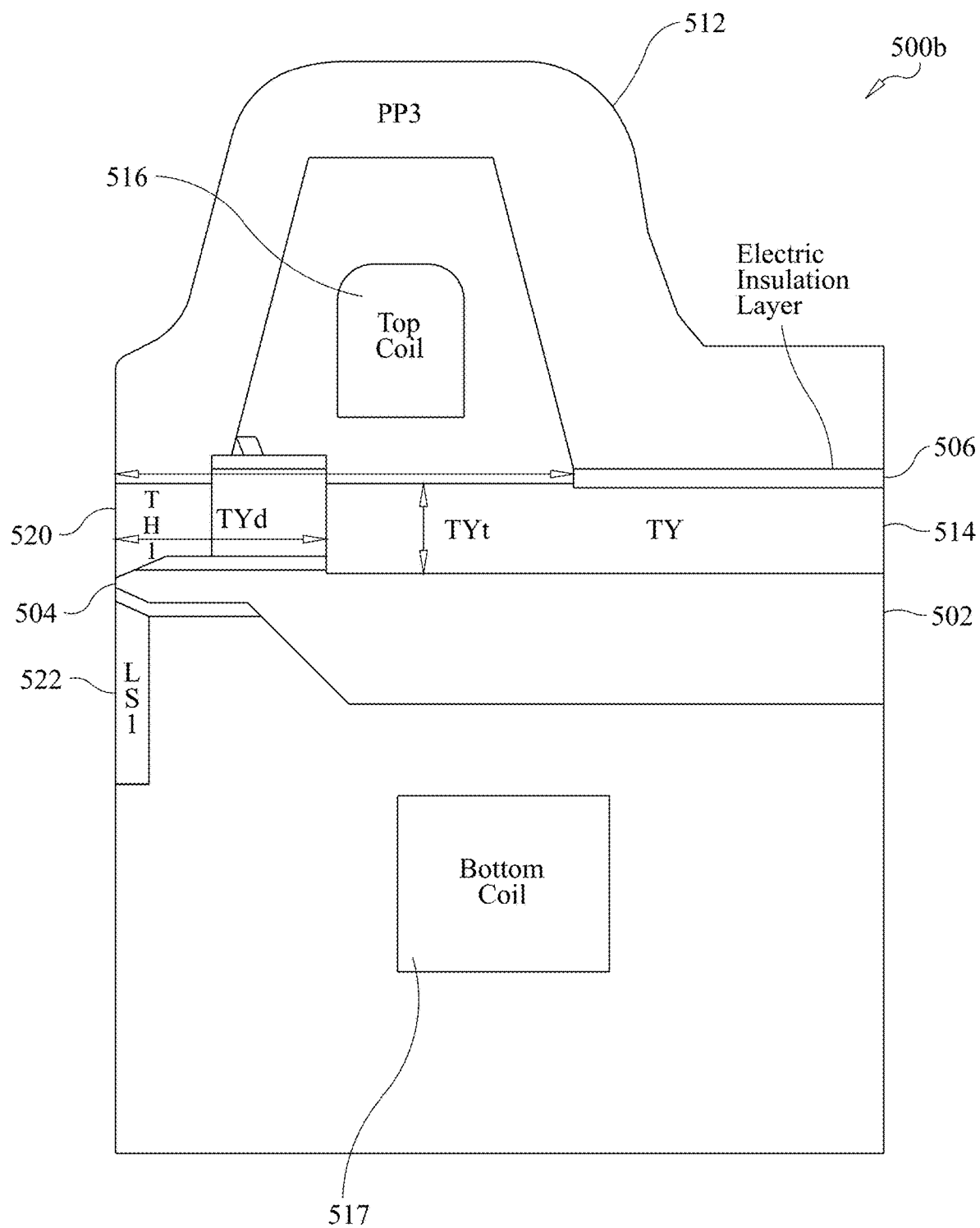
FIG. 5B illustrates a cross section view of a second example write head according to an embodiment.

FIG. 5B illustrates a cross section view of a second example write head 500b. As shown in FIG. 5B write head 500b can include a uDY top with a nDWS bottom portion. An electric insulation layer 506 can insulate a coil 516 and PP3 512 from the main pole 502.

Figure 5C:
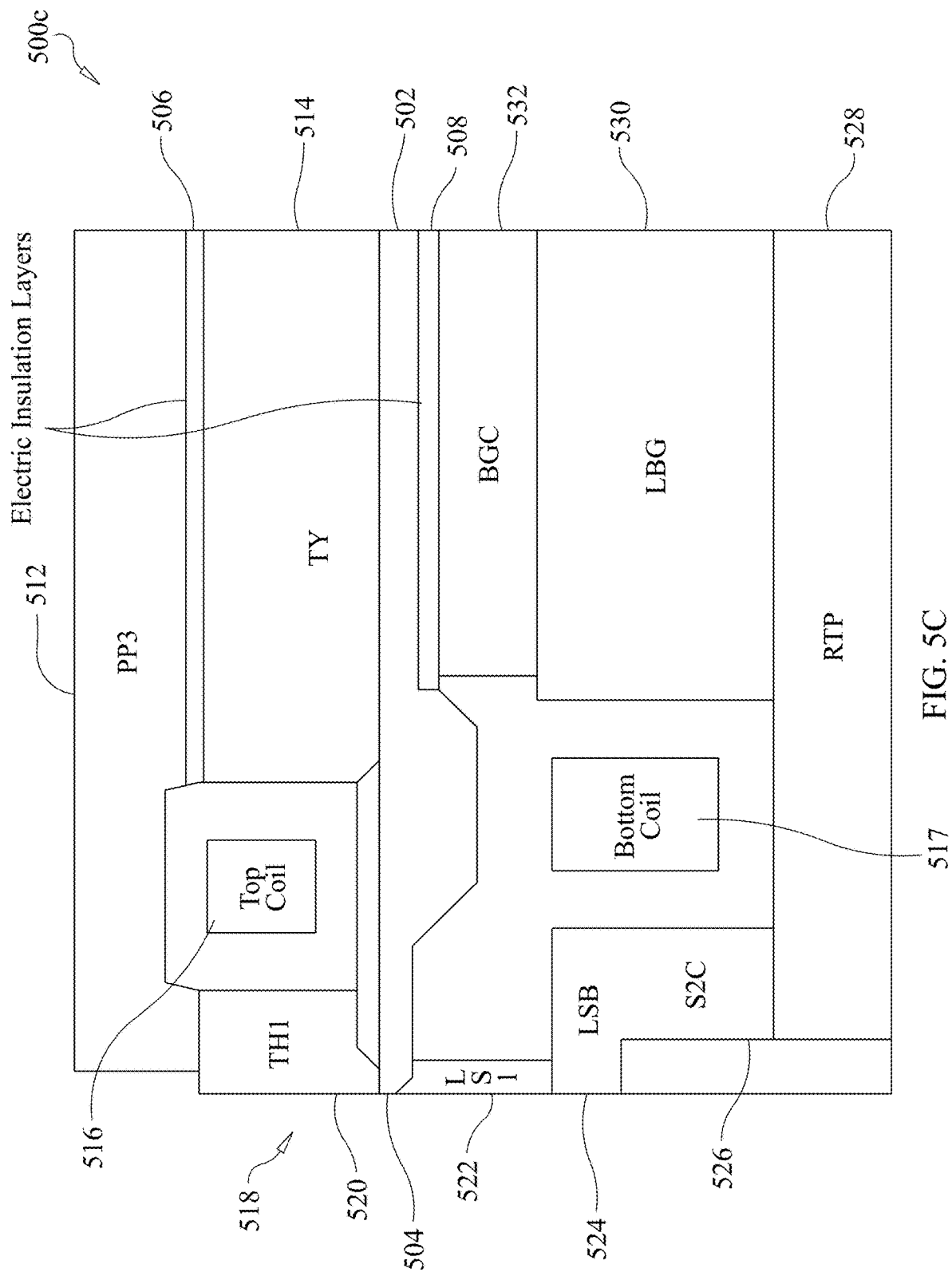
FIG. 5C illustrates a cross section view of a third example write head according to an embodiment.

FIG. 5C illustrates a cross section view of a third example write head 500c. As shown in FIG. 5C write head 500c can include an easy planar (ePL) top with a rDWS bottom portion. A first portion of the electric insulation layer 506 can be disposed between PP3 512 and TY 514. A second portion can separate the MP body from a BGC layer.

Figure 5D:
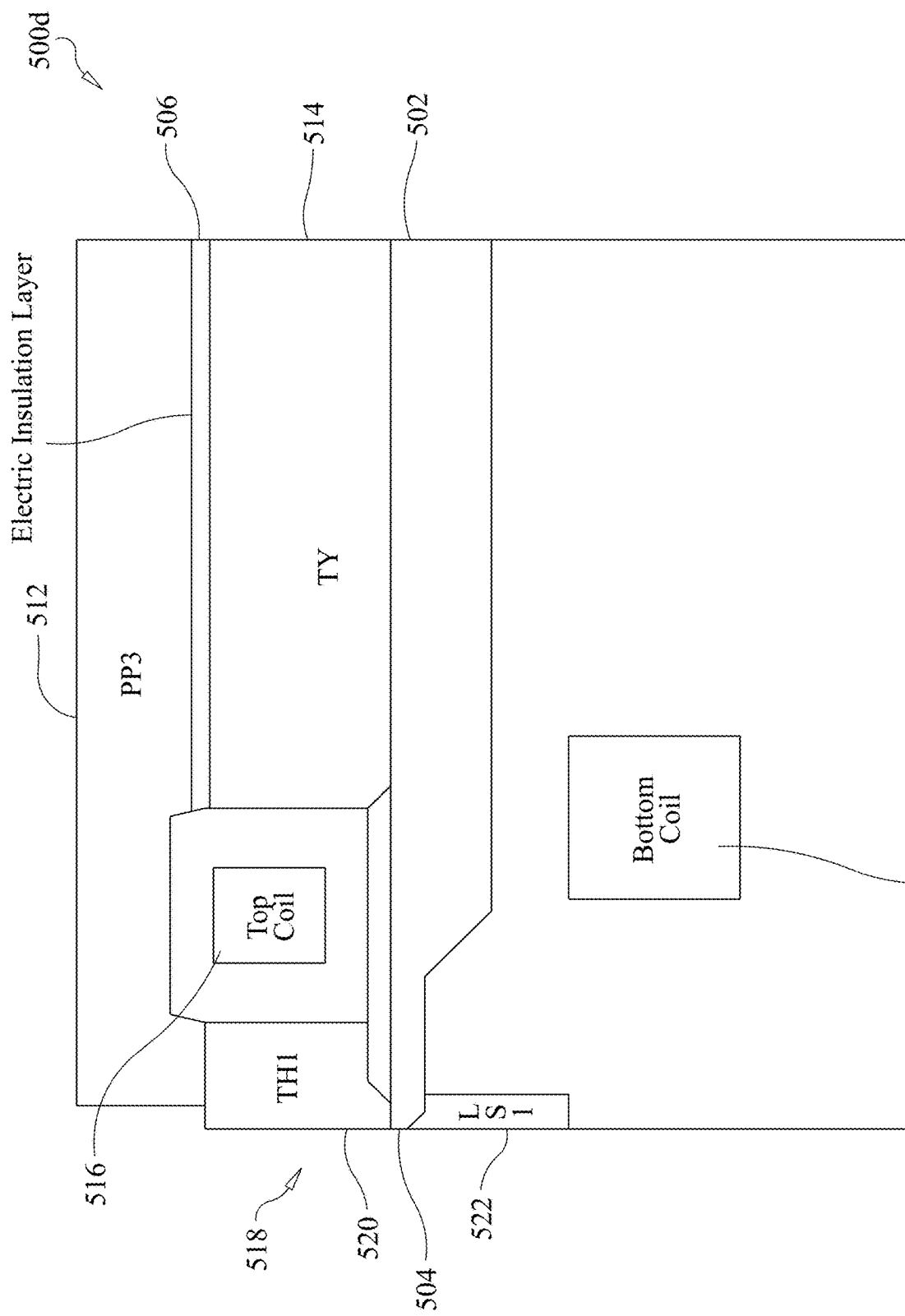
FIG. 5D illustrates a cross section view of a fourth example write head according to an embodiment.

FIG. 5D illustrates a cross section view of a fourth example write head 500d. As shown in FIG. 5D write head 500d can include an easy planar (ePL) top with a nDWS bottom portion.

For each of the heads as described in FIGS. 5A-5D, each can include a top coil 516 and bottom coil 517 to have writing current passing through a trailing shield (e.g., writing shield 1 520), PP3 512, MP 502, TY 514, and a taper bottom yoke (tBY) that can form a top driving magnetic loop that brings magnetic flux to the MP tip 504 to write positive or negative field into a media.

The PP3 512 can be exposed (e.g., as shown in FIG. 5A-5B) or recessed to the ABS (e.g., as shown in FIGS. 5C-5D). In some instances, the recessed PP3 can be exposed for less process steps if a wide area track erasure (WATE) to write shield (e.g., 520) interface is manageable. Further, the exposed PP3 can satisfy various thermomagnetic (T/M) metrics with a larger metal area at the ABS. The write heads as described herein can relate to either 1+1T writers or other writer types, such as 1+1T or 1+0T or 2+2T writer structures, for example.

Further, in the heads as shown in FIGS. 5A-5D, an electric insulation layer (e.g., 506, 508) can be added between PP3 512 and TY 514 to isolate the MP 502 electrically from the top loop. In some instances, due to a BGC in FIGS. 5A, 5C, an additional electric insulation layer 508 can be added to isolate MP electrically from the bottom loop. For instance, in FIG. 5A, the electric insulation layer 508 can be added between LBG 530 and MP 502. In FIG. 5C, electric insulation layer 508 can be added between BGC 532 and MP 502. The electric insulation layer 508 can be applicable to either a uDY or an ePL top structure. The electric insulation layer can include of one or more layers of a metallic oxide (e.g., AlOx, SiOx, TiOx or TaOx) with a thickness ranging between 10-300 nm.

Any of the write shields (e.g., write shield 520, a side shield, LS 522) can be electrically connected to a DFH ground pad. The MP tip can be electrically connected to either a trailing side hot seed (HS), the side shield (SS), or both the HS and the SS as described herein.

For all structures illustrated in FIGS. 5A-5D, an electric insulation layer can be added between PP3 and TY to isolate MP electrically from the top loop. Due to BGC in structures of FIGS. 5A and 5C, an additional electric insulation layer can be used to isolate MP electrically from the bottom loop, such as in FIG. 5A between LBG and MP and in FIG. 5C between BGC and MP. Although two isolation options are shown separately, both are applicable to either uDY or ePL top structures. The electric insulation layer can be made of single or multi-layers of AlOx, SiOx, TiOx or TaOx etc., with a thickness around 10-300 nm. Writer shields (TH1/SS/LS, etc.) can be electrically connected to the DFH ground pad (−).

Figure 6A:
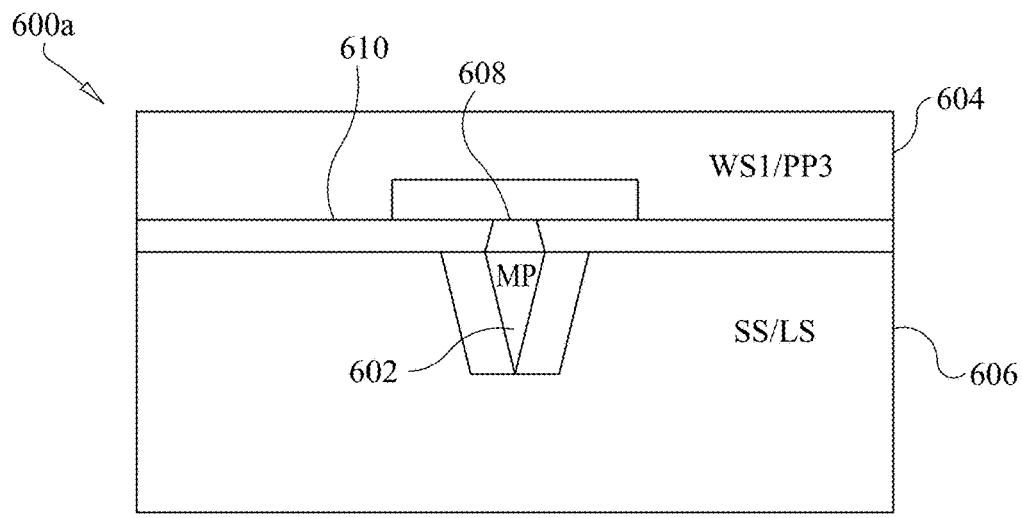
FIG. 6A illustrates a first design of a main pole with a narrow contact around a PWA width according to an embodiment.

For the TPP designs shown in FIGS. 2C and 2D, the MP can have contact to HS through WG and contact to SS and LS through SG and LG. In comparison with the designs in FIGS. 2A-2E, the metallic SG and LG connection may not only serve as a heat sink and allow more current flowing through the metallic WG connection (I_WG) without reliability concerns but also increase the total current flowing through MP bypassing through SG and LG (I_SG&LG) and offer additional ADC gain when I_WG and I_SG&LG maintain at a reasonable ratio. For the two cases, R_tip can be equivalent to R_SG&LG in parallel with R_WG. The current ratio between current flowing through SG&LG (I_SG&LG) and current flowing through WG (I_WG) can be equal to the resistance ratio R_WG/R_SG&LG. As contact area between WG to MP is smaller than SG to MP, R_WG/R_SG&LG can be larger than 4 unless a specific material selection or writer dimension modification to increase R_SG&LG and reduce R_WG. In some instances, wafers can be built with trailing shield WS1/PP3 fully separated from side and leading shield SS/LS and allow independent current bias (SPG design) to be applied through the WG branch and SG&LG branch as shown in FIG. 6A.

An increased ADC achievement can be found with I_SG&LG to I_WG ratio ~1-3. The independent current bias (SPG design) may need special preamp support and one additional pad in wafer layout. In some instances, the present embodiments can achieve I_SG&LG to I_WG ratio adjustment without process complication in MP region material selection and dimension modification and without wafer pad layout and preamp changes.

The present embodiments can provide a Tunable Two Bias Branches (TTB) design to offer a freedom in tuning bias current through WG branch and SG&LG branch for the maximum ADC benefit. For instance, the designs can fully separate WS1/PP3 and SS/LS electrically and form two bias branches, one from trailing shield to MP and another one from side shield and leading shield to MP.

For instance, the present embodiments can provide a TTB design that electrically separates WS1/PP3 and SS/LS to form tunable two bias branches. One branch can have a current flow between MP and trailing shield and another branch can have a current flowing between MP and side shield and leading shield. By selecting Rs value in a first TTB design or Rs1 and Rs2 value in a second TTB design, the ratio between I_WG, current flow through WG to trailing shield, and I_SG&LG, current flow through SG&LG to SS/LS, can be fine-tuned to achieve the best ADC with optimum reliability.

I_SG can be used to represent I_SG&LG and R_SG is used to represent R_SG&LG.

The present embodiments can also provide a TTB design that is applicable to existing PMR head pad layouts by constructing a bias circuit in parallel to writer heater. The bias current polarity can be set as from MP to shield or shield to MP.

The present embodiments can also provide a TTB design that is also applicable to head pad layout with two additional bias pads that can be directly driven by preamp with a selectable DC bias voltage/current source. Bias current polarity can be set as from MP to shield or shield to MP.

The present embodiments can also provide a TTB design that I_SG to I_WG ratio can be tuned to R_WG/(R_SG+Rs) for TTB #1 design and (R_WG+Rs1)/(R_SG+Rs2) for TTB #2 design. At Rs open, I_total=I_WG, it can behave like TPP as shown in FIG. 2A or 2E but can have higher bias current passing through owing to the metallic SG and LG providing lower resistance and cooling effect; At Rs=0 ohm, I_total is the sum of I_SG and I_WG and I_SG to I_WG ratio is R_WG/R_SG similar to TPP as shown in FIG. 2C or 2D; At Rs1 open and Rs2=0 ohm, it is like TPP as shown in FIG. 2B with I_total=I_SG; At Rs ~(R_WG/x-R_SG), I_SG to I_WG ratio can be tuned to the desired ratio x for best ADC and optimum reliability.

Figure 6B:
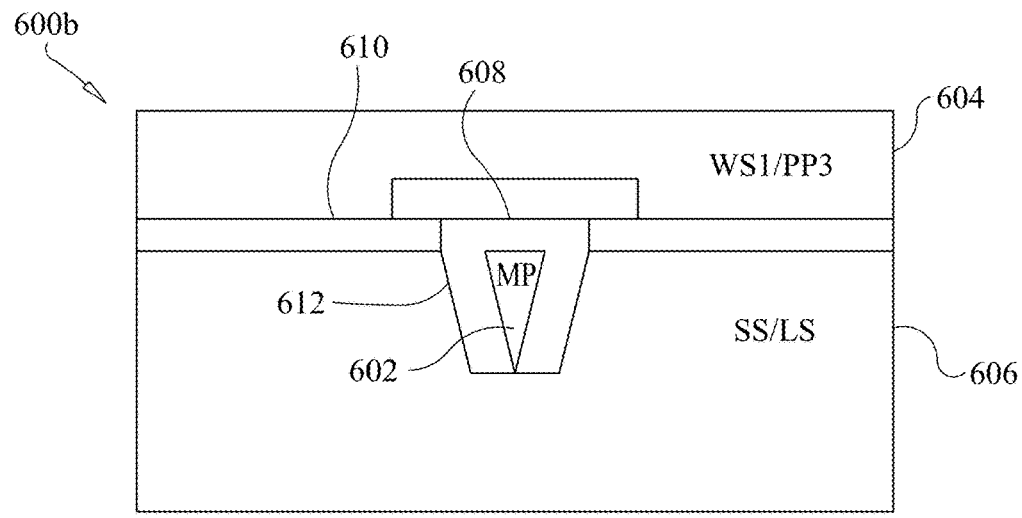
FIG. 6B illustrates a first design of a main pole with a middle contact up to around a PWA+2SG width according to an embodiment.
Figure 6C:
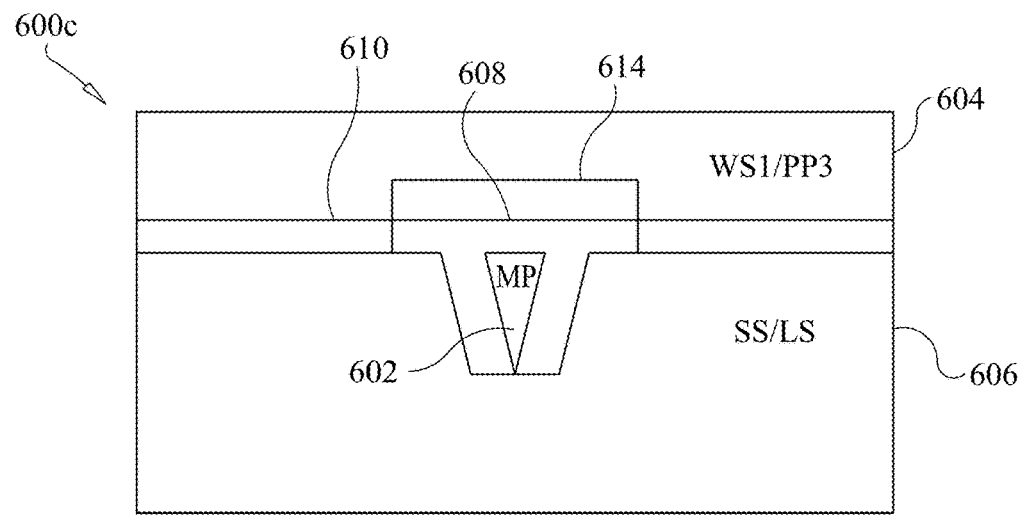
FIG. 6C illustrates a first design of a main pole with a full contact around a HS width according to an embodiment.

To fully separate WS1/PP3 and SS/LS electrically, an insulation layer with thickness 60-100 nm at 1-2 um away from MP center to full shield width can be inserted between WS1 and SS/LS. From HS width to 1-2 um away from MP center, an insulation layer thickness can be ~15-60 nm depending on the designs. Narrow Contact can refer to WG path to SG path with contact width around PWA, Middle Contact can refer to the contact width around PWA+2SG, and Full Contact can refer to no separation between WG path and SG path at full HS width. The insulation layer thickness within HS width can be close or slightly thicker than WG thickness (typically 15-25 nm) as shown in FIG. 6A-C or as thin as 1-10 nm as shown in FIGS. 7A, 7B, 8A, 8B, 9A and 9B. The contact width can be selected at a nominal value from Narrow Contact to Middle Contact or Full Contact depending on ADC gain and process complexity trade-off.

The insulation layer can consist of one or multiple oxide layers such as Al2Ox, SiOx, TaOx, TiOx, MgOx etc., or other high resistive insulation materials such as SiN, SiON, etc. The materials of metallic connection at WG and SG can be single layer or multi-layers of non-magnetic metallic materials such as Ru, NiCr, Ta, Cu, W, Ti etc.

Figure 7A:
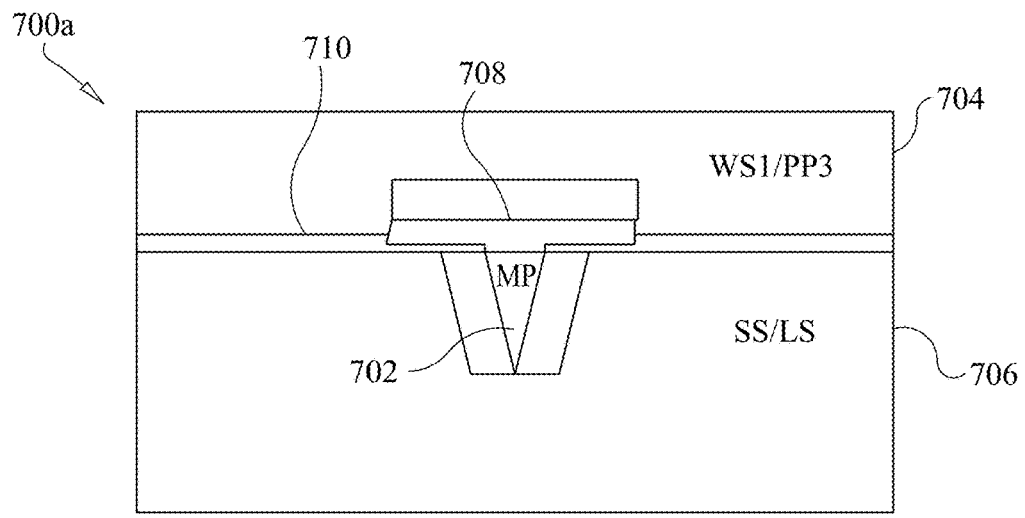
FIG. 7A illustrates a first design of a main pole with a narrow contact around a PWA width according to an embodiment.
Figure 7B:
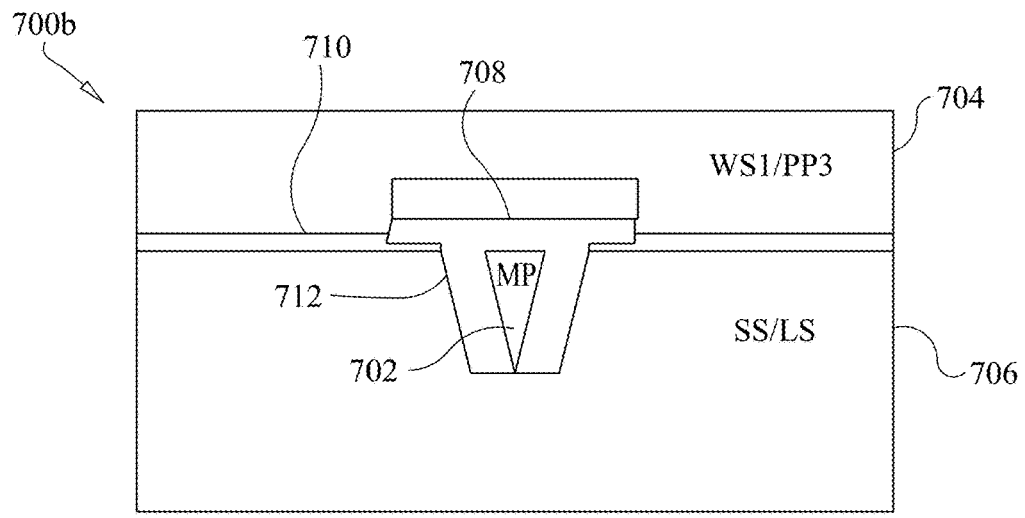
FIG. 7B illustrates a first design of a main pole with a middle contact up to around a PWA+2SG width according to an embodiment.
Figure 7C:
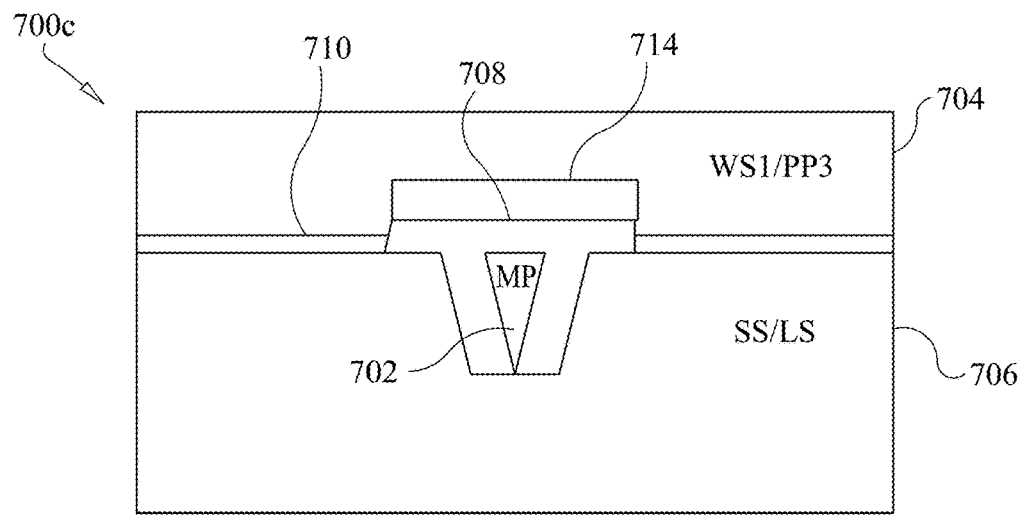
FIG. 7C illustrates a first design of a main pole with a full contact around a HS width according to an embodiment.
Figure 8A:
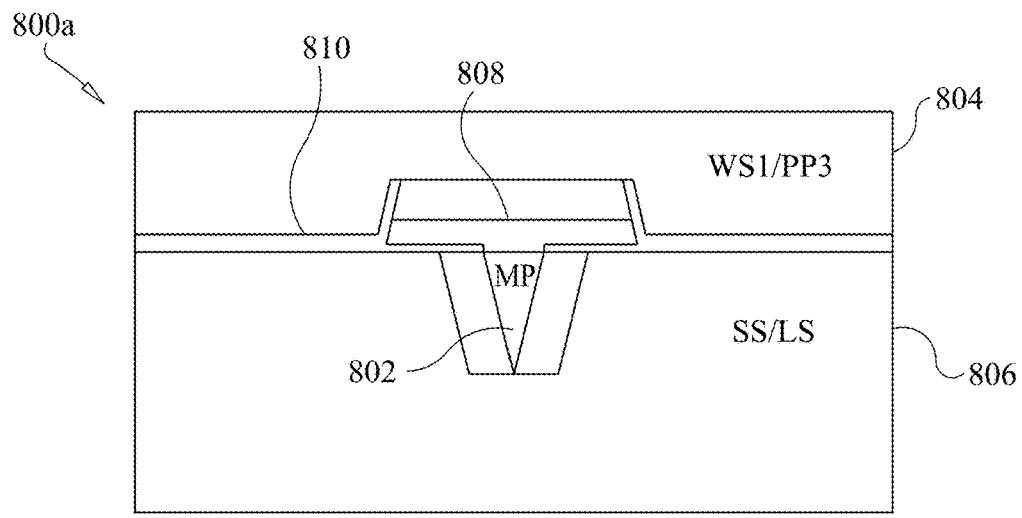
FIG. 8A illustrates a first design of a main pole with a narrow contact around a PWA width according to an embodiment.
Figure 8B:
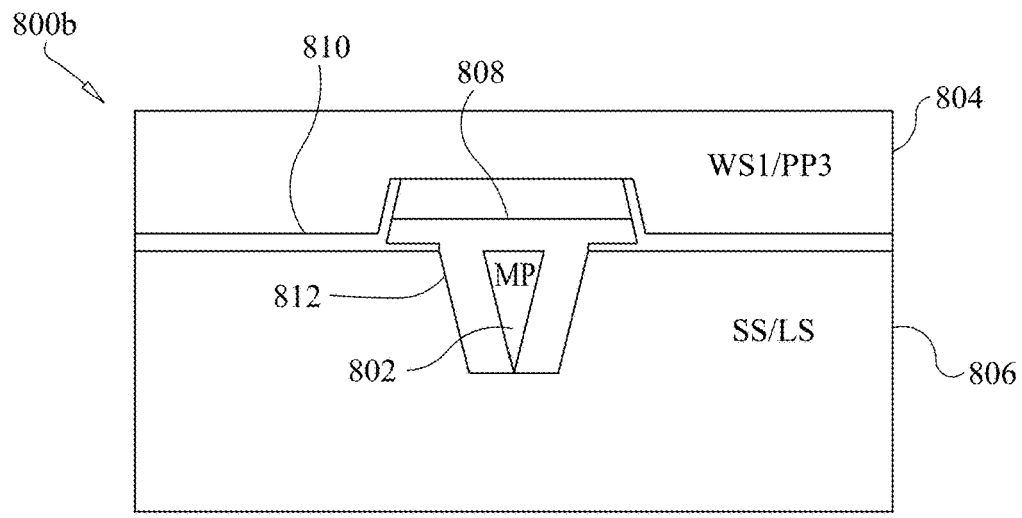
FIG. 8B illustrates a first design of a main pole with a middle contact up to around a PWA+2SG width according to an embodiment.
Figure 8C:
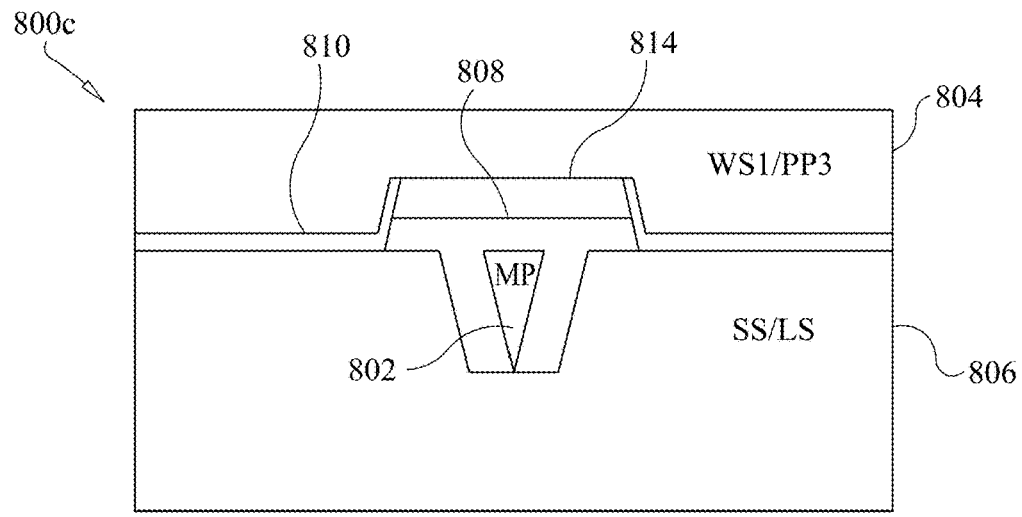
FIG. 8C illustrates a first design of a main pole with a full contact around a HS width according to an embodiment.
Figure 9A:
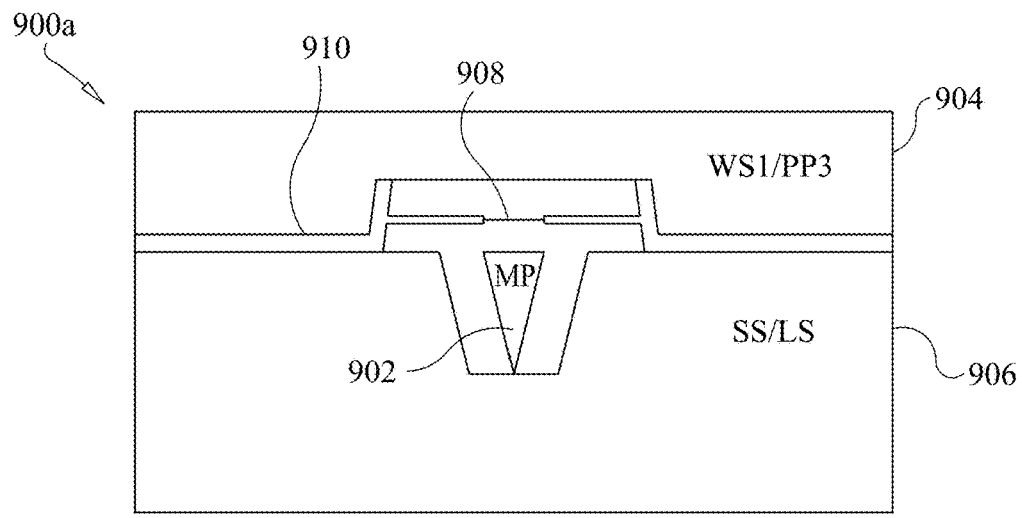
FIG. 9A illustrates a first design of a main pole with a narrow contact around a PWA width according to an embodiment.
Figure 9B:
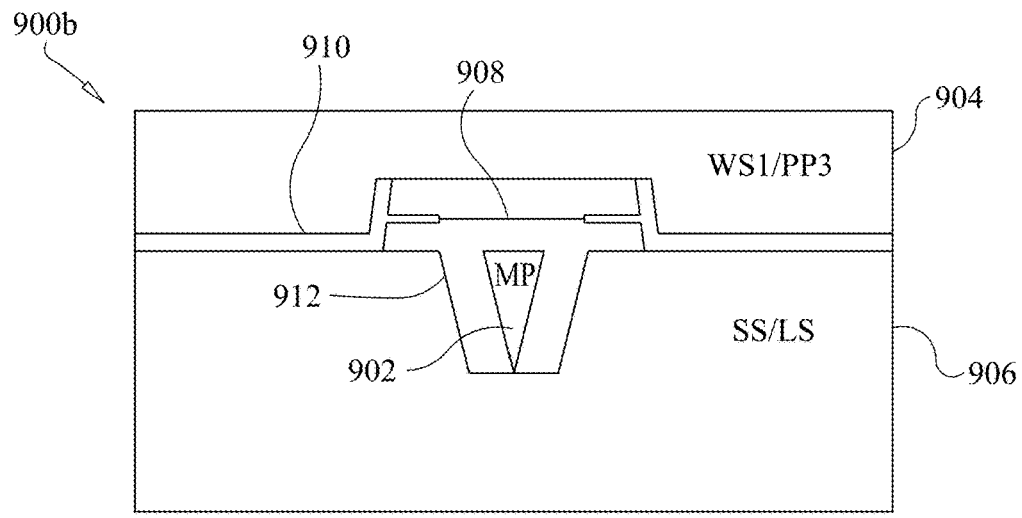
FIG. 9B illustrates a first design of a main pole with a middle contact up to around a PWA+2SG width according to an embodiment.
Figure 9C:
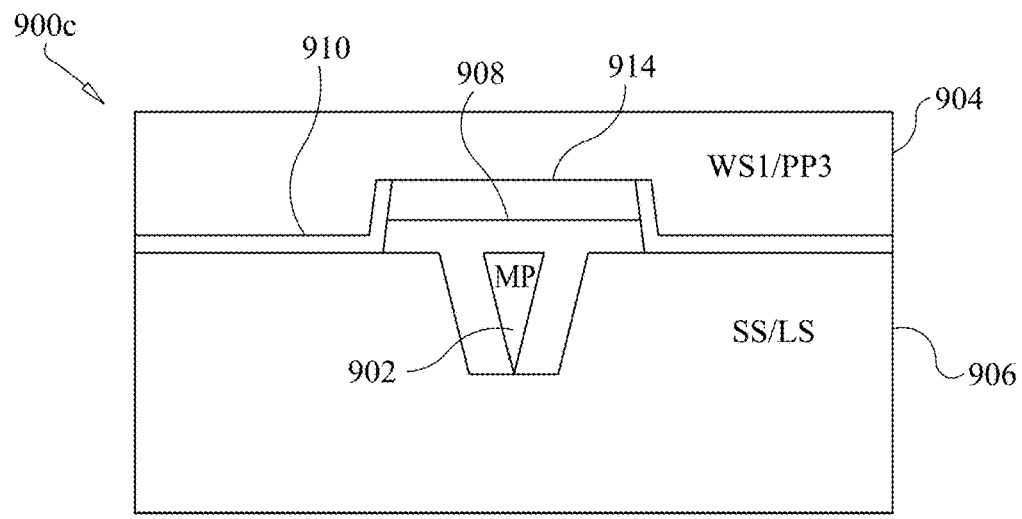
FIG. 9C illustrates a first design of a main pole with a full contact around a HS width according to an embodiment.

FIGS. 6A-6C shows aspects of a first embodiment to form the electrical separation at WG layer. The MP to trailing shield contact at ABS view can be classified as Narrow Contact around a PWA width, Middle Contact up to around PWA+2SG width and Full Contract around full HS width. The MP to trailing shield contact at the cross-section into ABS view can be thin, such as around 20-60 nm as shown in FIG. 3D. Any contact width between Narrow to Middle can offer further confinement and separation of current through two bias branches. The optimum width can include a balance between ADC gain and process complexity and controllability. The designs in FIGS. 7A-7C, FIGS. 8A-8C, and FIGS. 9A-9C can show some other designs to form the electrical separation between two branches. FIGS. 7A-7C can include a thicker insulation layer at far side while thinner insulation layer below WG with contact from Narrow to Middle and Full width. FIGS. 8A-8C includes designs similar to the designs in FIGS. 7A-7C, except for an insulation layer between WS1 and HS at the side contact. FIGS. 9A-9C includes designs similar to the designs in FIGS. 8A-8C, except for the thinner insulation layer built above WG to form contact from Narrow to Middle and Full width. The metallic WG thickness can be around 15-25 nm. The insulation separation layer thickness beyond 1-2 um away from MP center can be much thicker than WG thickness e.g., 60-100 nm for all designs shown in FIGS. 6A-6C, FIGS. 7A-7C, FIGS. 8A-8C, FIGS. 9A-9C.

The insulation layer thickness within 1-2 um away from MP can be close or slightly thicker than WG the designs in FIGS. 6A-6C. For designs shown in FIGS. 7A-7C, FIGS. 8A-8C, FIGS. 9A-9C, the insulation layer thickness can be 15-60 nm from HS width to 1-2 um away from MP center and 1-10 nm within HS width. The insulation layer can consist of one or multiple oxide layers such as Al2Ox, SiOx, TaOx, TiOx, MgOx etc., or other high resistive insulation materials such as SiN, SiON, etc. The materials of metallic connection at WG and SG can be a single layer or multi-layers of non-magnetic metallic materials such as Ru, NiCr, Ta, Cu, W, Ti etc.

As noted above, FIGS. 6A-6C illustrate a design to electrically separate WS1/PP3 and SS/LS at WG layer to form two bias branches. FIG. 6A illustrates a first design 600A of a main pole with a narrow contact around a PWA width. As shown in FIG. 6A, the main pole 602 can be connected to a contact 608 and a dielectric 610. Further, the write head can also include a WS1/PP3 604 and a SS/LS 606.

FIG. 6B illustrates a first design 600B of a main pole with a middle contact up to around a PWA+2SG. As shown in FIG. 6B, the width of the contact 608 can match up to the width of the SGs 612 disposed around the MP 602.

FIG. 6C illustrates a first design 600C of a main pole with a full contact around a HS width. As shown in FIG. 6B, the width of the contact 608 can match the width of the HS 614.

As noted above, FIGS. 7A-7C illustrate a design to electrically separate WS1/PP3 and SS/LS with a thicker insulation layer between WS1 and SS and a thinner insulation layer below metallic WG layer to form two bias branches. FIG. 7A illustrates a second design 700A of a main pole with a narrow contact around a PWA width. As shown in FIG. 7A, the main pole 702 can be connected to a contact 708 and a dielectric 710. Further, the write head can also include a WS1/PP3 704 and a SS/LS 706.

FIG. 7B illustrates a second design 700B of a main pole with a middle contact up to around a PWA+2SG. As shown in FIG. 7B, the width of the contact 708 can match up to the width of the SGs 712 disposed around the MP 702.

FIG. 7C illustrates a second design 700C of a main pole with a full contact around a HS width. As shown in FIG. 7B, the width of the contact 708 can match the width of the HS 714.

Further, as noted above, FIGS. 8A-8C illustrate a design to electrically separate WS1/PP3 and SS/LS with a thicker insulation layer between WS1 and SS, a layer between WS1 and HS at side and a thinner insulation layer below metallic WG layer to form two bias branches. FIG. 8A illustrates a third design 800A of a main pole with a narrow contact around a PWA width. As shown in FIG. 8A, the main pole 802 can be connected to a contact 808 and a dielectric 810. Further, the write head can also include a WS1/PP3 804 and a SS/LS 806.

FIG. 8B illustrates a third design 800B of a main pole with a middle contact up to around a PWA+2SG. As shown in FIG. 8B, the width of the contact 808 can match up to the width of the SGs 812 disposed around the MP 802.

FIG. 8C illustrates a third design 800C of a main pole with a full contact around a HS width. As shown in FIG. 8B, the width of the contact 808 can match the width of the HS 814.

Further, as noted above, FIGS. 9A-9C illustrate a design to electrically separate WS1/PP3 and SS/LS with a thicker insulation layer between WS1 and SS, a layer between WS1 and HS at side and a thinner insulation layer above metallic WG layer to form two bias branches. FIG. 9A illustrates a fourth design 900A of a main pole with a narrow contact around a PWA width. As shown in FIG. 9A, the main pole 902 can be connected to a contact 908 and a dielectric 910. Further, the write head can also include a WS1/PP3 904 and a SS/LS 906.

FIG. 9B illustrates a fourth design 900B of a main pole with a middle contact up to around a PWA+2SG. As shown in FIG. 9B, the width of the contact 908 can match up to the width of the SGs 912 disposed around the MP 902.

FIG. 9C illustrates a fourth design 900C of a main pole with a full contact around a HS width. As shown in FIG. 9B, the width of the contact 908 can match the width of the HS 914.

Figure 10A:
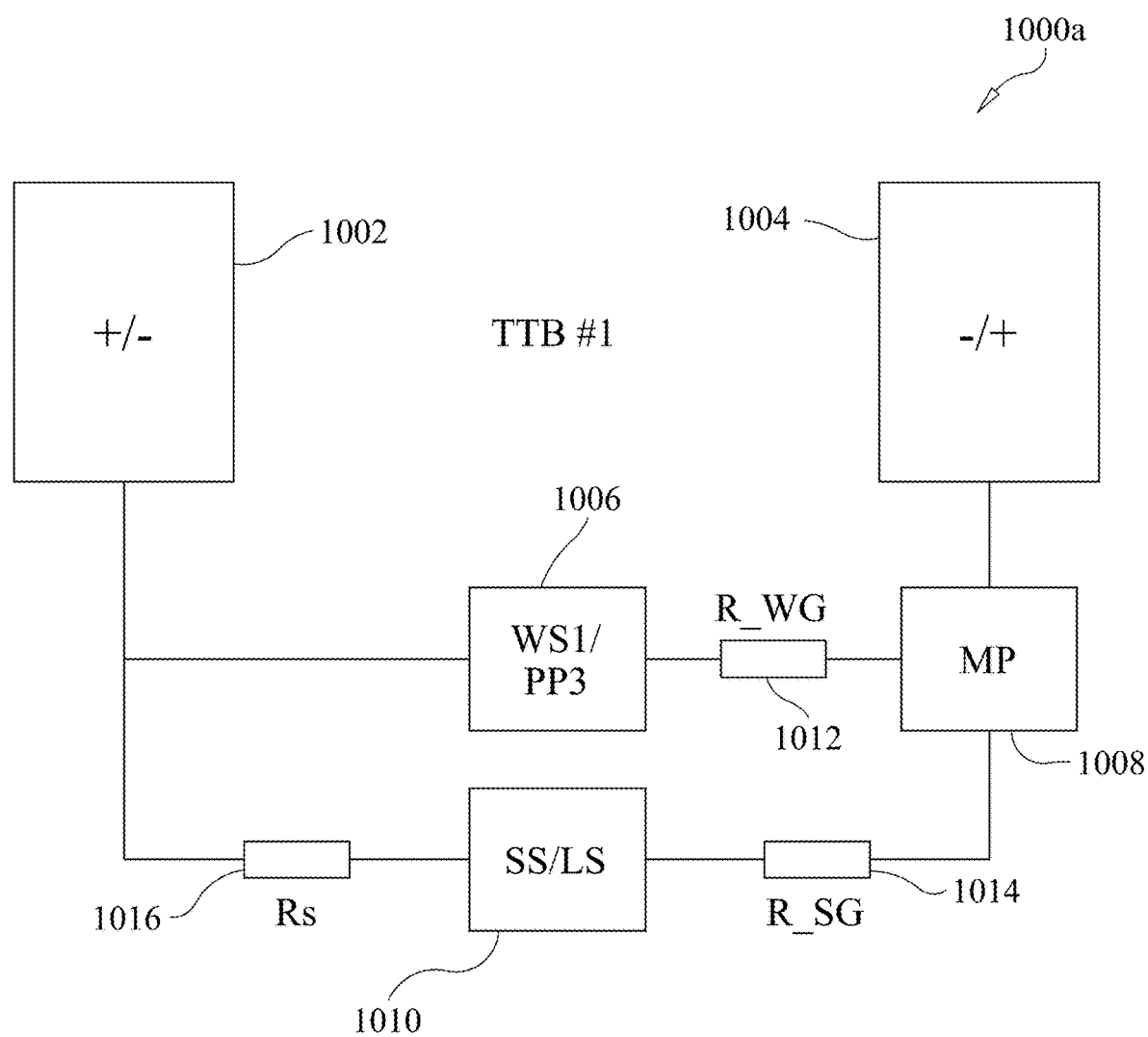
FIG. 10A provides a first example electric circuit for a TTB design according to an embodiment.
Figure 10B:
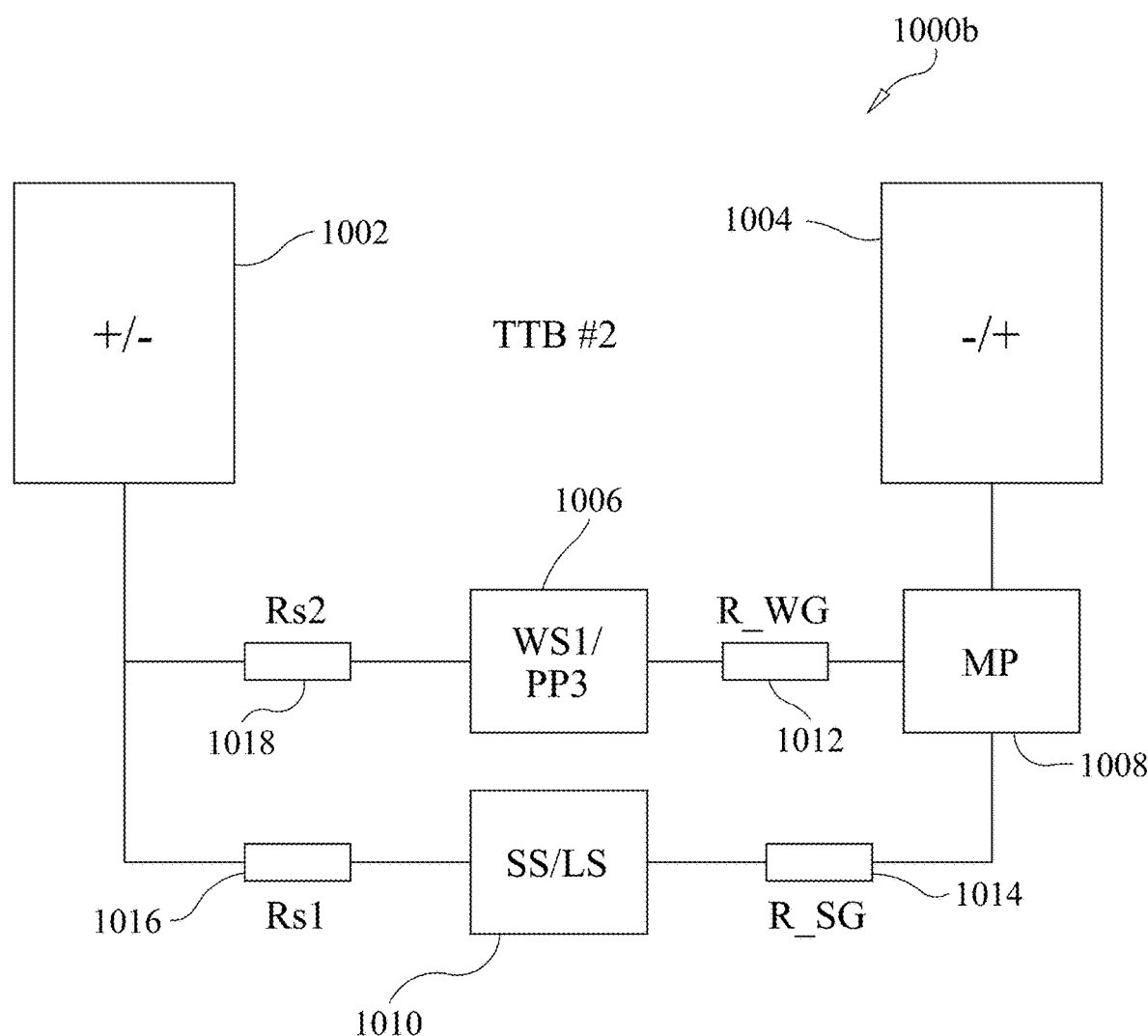
FIG. 10B provides a second example electric circuit for a TTB design according to an embodiment.

FIGS. 10A-10B provide electric circuits of example TTB designs. In FIG. 10A, the circuit 1000A can include two pads 1002, 1004. Further, the circuit can include a WS1/PP3 1006, R_WG 1012, and a MP 1008 in series between the pads 1002, 1004. The circuit can also include a Rs 1016, SS/LS 1010, and R_SG 1014 in series. R_SG represents R_SG&LG. Further, in FIG. 10B, the circuit 1000B can include a Rs2 1018, WS1/PP3 1006, R_WG 1012, and a MP 1008 connected in series between the pads 1002, 1004. The first circuit 1000A can be considered as a case when Rs2~0 and Rs1=Rs in the second circuit 1000B. The TTB bias pads can include writer heater pads as shown FIG. 1 and bias pads to preamp as shown in FIG. 4.

Table 1 below illustrates aspects of various TTB design concepts.

TABLE 1

|            | Case #1 | Case #2 | Case #3 | Case #4 | Case #5 | Case #6 |
|------------|---------|---------|---------|---------|---------|---------|
| R_WG (ohm) | 9       | 9       | 9       | 5       | 5       | 5       |
| R_SG (ohm) | 2       | 2       | 2       | 2       | 2       | 2       |
| Rs (ohm)   | 0       | 3       | 3       | 0       | 3       | 3       |
| I_WG (mA)  | 5       | 5       | 7       | 5       | 5       | 7       |
| I_SG (mA)  | 22.5    | 9       | 12.6    | 12.5    | 5       | 7       |
| I_Total (mA) | 27.5  | 14      | 19.6    | 17.5    | 10      | 14      |

In the embodiments in FIGS. 10A-10B, various combinations can be achieved by TTB designs to achieve the best ADC performance under device reliability and process complexity optimization. For the first design 1000A (or TTB #1), if Rs is open, it can be an equivalent TPP shown in FIG. 2A or 2E with single current flow path from MP to trailing shield or trailing shield to MP, however, the metallic SG can allow higher current to pass through the WG for more ADC gain than FIG. 2A or 2E as it can offer lower MP tip resistance (R_tip) and better heat dissipation at MP tip region. For TTB #1, if Rs is shorted ~0 ohm, it can be equivalent TPP shown in FIG. 2C or 2D except the contact width between MP to trailing shield can be adjusted to any width from Narrow ~PWA e.g., FIG. 2C to Full ~HS width e.g. FIG. 2D. For TTB #1, Rs can also be designed to achieve a desired I_SG: I_WG current ratio x by making Rs ~R_WG/x-R_SG for the best ADC gain. R_SG represents R_SG&LG and I_SG represents I_SG&LG.

Table 1 above can provide a few examples to illustrate TTB design concept. Case #1 has R_WG ~9 ohm and R_SG ~2 ohm. If Rs is at 0 ohm, total current I_total needs to be 27.5 mA in order to get I_WG ~5 mA. Generally, I_total less than 22 mA may be necessary to have enough device reliability margin. Under Case #1, in order to satisfy device reliability requirement, ADC gain is limited due to the fact that I_WG has to be lower than 5 mA. Case #2 & #3 has the same R_WG and R_SG as Case #1. With Rs =3 ohm, I_total 14 mA is enough to provide I_WG 5 mA as shown in Case #2 and I_total 19.6 mA can provide even I_WG ~7 mA as shown in Case #3. Basically, more ADC gain can be achieved without running into device reliability upper bound. R_WG is assumed reduced to 5 ohm in Case #4-#6, With lower R_WG and the same R_SG ~2 ohm, I_WG ~5 mA can be reached under Rs ~0 ohm with I_total ~17.5 mA for Case #4. With Rs ~3 ohm, I_SG to I_WG ratio ~1 can be achieved. I_total ~10 mA is enough to provide I_WG ~5 mA for Case #5 and I_total ~14 mA is enough to provide I_WG~7 mA for Case #6. It may be preferred to have the maximum ADC gain from the least I_total application as power consumption is proportional to I_total^2.

TTB #1 can be a subset of TTB #2. TTB #2 can allow for two built-in resistors Rs1 and Rs2 and more freedom in I_WG to I_SG ratio adjustment when necessary. One special case from TTB #2 can include Rs1 open and Rs2 ~0. In this case, no current may flow through trailing shield and current is forced to flow through SS/LS similar to FIG. 2B.

In a first example embodiment, a perpendicular magnetic recording (PMR) write head is provided. The PMR write head can include a main pole (e.g., 602) including a tip portion configured to be disposed at an air-bearing surface (ABS) and configured to interact with a magnetic recording medium. The PMR write head can also include a write gap(WG) (e.g., 608) disposed adjacent to the main pole and a hot seed (HS) layer (e.g., 614) connected to the WG. The PMR write head can also include a trailing shield (e.g., 604) and a side shield and leading shield (e.g., 606).

Two tunable bias branches can be formed to electrically separate the trailing shield and the side shield and leading. A first branch can a first electrical path between the main pole and the trailing shield. An example of the first branch can include a path between the trailing shield 1006, WG equivalent resistor R_WG 1012, and MP 1008 of the circuit in FIG. 10A. The tunable bias branches can also include a second branch forming a second electrical path between the main pole and the side shield and leading shield. An example of the second branch can include a path between the series resistor 1016, side shield and leading shield 1010, the SG&LG equivalent resistor R_SG&LG simplified to R_SG 1014, and MP 1008 of the circuit in FIG. 10A.

In some instances, the PMR write head can include an insulation layer (e.g., 610) disposed between the trailing shield (e.g., 604) and the side shield and leading shield (e.g., 606).

In some instances, a width of the write gap corresponds with a width of the main pole (e.g., WG 608 in FIG. 6A). The insulation layer can separate the side shield (e.g., 606) and the HS layer (e.g., 614).

In some instances, a width of the write gap corresponds with a width of up to the main pole and two SGs (e.g., WG 608 in FIG. 6B). The insulation layer can separate the HS layer and the side shield.

In some instances, a width of the write gap corresponds with a width of the HS layer (e.g., WG 608 in FIG. 6C).

In some instances, the insulation layer (e.g., 710 in FIG. 7) comprises a first portion separating the trailing shield and the side shield and leading shield, and a second portion disposed between the side shield and the write gap. The second portion can include a thickness less than that of the first portion.

In some instances, the insulation layer (e.g., 810 in FIG. 8) further comprises a third portion disposed along sides of the write gap and the HS layer.

In some instances, the insulation layer (e.g., 910 in FIG. 9) comprises a first portion separating the trailing shield and the side shield and leading shield, and a second portion disposed between the HS and the write gap (WG), and a third portion disposed along sides of the write gap and the HS layer.

In some instances, the PMR write head can include two electrical contacts (e.g., 1002, 1004 in FIG. 10A) providing an electrical current to the PMR write head.

In some instances, the first electrical path is formed between a first electrical contact, the trailing shield, a write gap equivalent resistor R_WG, and the main pole, and the second electrical contact.

In some instances, the second electrical path is formed between the first electrical contact, a first series resistor, the side shield, a side and leading gap equivalent resistor R_SG&LG, simplified to R_SG, the main pole, and the second electrical contact, wherein the first electrical path is disposed in parallel with the second electrical path.

In some instances, the first electrical path is formed between the first electrical contact, a second series resistor, the trailing shield, the write gap equivalent resistor R_WG, the main pole, and the second electrical contact.

Another example embodiment relates to a device. The device can include a main pole and two electrical contacts configured to provide an electrical current. The device can also include a first tunable bias branch forming a first electrical path between the main pole and a trailing shield. The device can also include a second tunable bias branch forming a second electrical path between the main pole and a side shield and leading shield. The electrical current provided by the two electrical contacts can be configured to flow along both the electrical path and the second electrical path.

In some instances, the second tunable bias branch further comprises: a first series resistor disposed in series with the side shield and leading shield and a side and leading gap (SG&LG) equivalent resistor R_SG&LG, simplified to R_SG, disposed in series between the side shield and the main pole.

In some instances, the first tunable bias branch further comprises a write gap (WG) equivalent resistor R_WG disposed in series between the trailing shield and the main pole.

In some instances, the first tunable bias branch further comprises a second series resistor disposed in series with the trailing shield.

In some instances, a resistance value of any of the first series resistor and the second series resistor can be modified to adjust a ratio between a first current flow value through the write gap to the trailing shield and a second current flow value through the side gap and leading gap to the side shield and leading shield.

In some instances, the device can also include a write gap(WG) disposed adjacent to the main pole; a hot seed (HS) layer connected to the WG; and an insulation layer disposed between the trailing shield and the side and leading shields.

In some instances, a width of the write guard corresponds with any of: a width of the main pole, a width of up to the main pole and two SGs, and a width of the HS layer.

Another example embodiment provides a system. The system can include a main pole, a write gap (WG) disposed adjacent to the main pole, a hot seed (HS) layer connected to the WG, and an insulation layer. The system can also include a first tunable bias branch forming a first electrical path between the main pole and a trailing shield. The system can also include a second tunable bias branch forming a second electrical path between the main pole and a side and leading shield. Any of the WG and the insulation layer can electrically separate the trailing shield and side and leading shield for form the first tunable bias branch and the second tunable bias branch.

In some instances, the insulation layer includes one or more layers of an oxide material. Example oxide materials can include Al2Ox, SiOx, TaOx, TiOx, MgOx, etc. The insulation layer can also include other high resistive insulation materials such as SiN, SiON, etc.

Further, the write gap can include one or more layers of a non-magnetic metallic material, such as Ru, NiCr, Ta, Cu, W, Ti, etc.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A perpendicular magnetic recording (PMR) write head comprising:
   a main pole including a tip portion configured to be disposed at an air-bearing surface (ABS) and configured to interact with a magnetic recording medium;
   a write gap (WG) disposed adjacent to the main pole;
   a hot seed (HS) layer connected to the WG;
   a trailing shield; and
   a side shield and leading shield, wherein two tunable bias branches are formed to electrically separate the trailing shield and the side and leading shields, with a first branch forming a first electrical path between the main pole and the trailing shield, and a second branch forming a second electrical path between the main pole and the side and leading shields, wherein:
   the first electrical path is formed between a first electrical contact, the trailing shield, a conducting write gap equivalent resistor, and the main pole, and a second electrical contact, and
   the second electrical path is formed between the first electrical contact, a first series resistor, the side shield, a conducting side gap and leading gap equivalent resistor, the main pole, and the second electrical contact, wherein the first electrical path is disposed in parallel with the second electrical path.

2. The PMR write head of claim 1, further comprising:
   an insulation layer disposed between the trailing shield and the side and leading shields.

3. The PMR write head of claim 2, wherein a width of the write gap corresponds with a top width of the main pole at the ABS, and wherein the insulation layer separates the side shield and the conducting side gap from the HS layer.

4. The PMR write head of claim 2, wherein the insulation layer separates the HS layer and the side shield.

5. The PMR write head of claim 2, wherein a conducting width of the write gap corresponds with a width of the HS layer.

6. The PMR write head of claim 2, wherein the insulation layer comprises a first portion separating the trailing shield from the side shield and leading shield and a second portion disposed between the side shield and the write gap, wherein the second portion includes a thickness less than that of the first portion.

7. The PMR write head of claim 6, wherein the insulation layer further comprises a third portion disposed along sides of the write gap and the HS layer.

8. The PMR write head of claim 2, wherein the insulation layer comprises a first portion separating the trailing shield from the side shield and leading shield and a second portion disposed between the HS and the write gap, wherein the second portion includes a thickness less than that of the first portion.

9. The PMR write head of claim 8, wherein the insulation layer further comprise a third portion disposed alongside of the write gap and the HS layer.

10. A device comprising:
a main pole;
two electrical contacts configured to provide an electrical current;
a first tunable bias branch forming a first electrical path between the main pole and a trailing shield; and
a second tunable bias branch forming a second electrical path between the main pole and a side shield and a leading shield, and wherein the electrical current provided by the two electrical contacts is configured to flow along both the first electrical path and the second electrical path, the second tunable bias branch comprising:
  a first series resistor disposed in series with the side and leading shields; and
  a side gap (SG) and leading gap (LG) equivalent resistor disposed in series between the side and leading shields and the main pole.

11. The device of claim 10, wherein the first tunable bias branch further comprises a write gap (WG) equivalent resistor disposed in series between the trailing shield and the main pole.

12. The device of claim 11, wherein the first tunable bias branch further comprises a second series resistor disposed in series with the trailing shield.

13. The device of claim 12, wherein a resistance value of any of the first series resistor and the second series resistor can be modified to adjust a ratio between a first current flow value through the write gap to the trailing shield and a second current flow value through the side gap and leading gap equivalent resistor to the side shield and the leading shield.

14. The device of claim 10, further comprising:
a write gap (WG) disposed adjacent to the main pole;
a hot seed (HS) layer connected to the WG; and
an insulation layer disposed between the trailing shield and the side and leading shields.

15. The device of claim 14, wherein a contact width of the write gap corresponds with any of: a width of a main pole top width, a width of the main pole top width up to the main pole top width+twice a width of the side gap, and a width of the HS layer.

16. A system comprising:
a main pole;
a write gap (WG) disposed adjacent to the main pole;
a hot seed (HS) layer connected to the WG;
an insulation layer;
a first tunable bias branch forming a first electrical path between the main pole and a trailing shield; and
a second tunable bias branch forming a second electrical path between the main pole and a side shield and a leading shield, wherein any of the WG and the insulation layer electrically separate the trailing shield and side and leading shields for forming the first tunable bias branch and the second tunable bias branch, wherein:
the first electrical path is formed between a first electrical contact, the trailing shield, a conducting write gap equivalent resistor, and the main pole, and a second electrical contact, and
the second electrical path is formed between the first electrical contact, a first series resistor, the side shield, a conducting side gap and leading gap equivalent resistor, the main pole, and the second electrical contact, wherein the first electrical path is disposed in parallel with the second electrical path.

17. The system of claim 16, wherein the insulation layer includes one or more layers of an oxide material, and wherein the write gap comprises one or more layers of a non-magnetic metallic material.

* * * * *